US012633427B2

(12) United States Patent
Lang

(10) Patent No.: US 12,633,427 B2
(45) Date of Patent: May 19, 2026

(54) COMPUTER APPARATUS FOR MONITORING AND VERIFYING NUCLEAR AND FOSSIL POWER PLANT HEAT LOSSES BASED ON THE REVISED NCV METHOD

(71) Applicant: Fred Donald Lang, Salt Spring Island (CA)

(72) Inventor: Fred Donald Lang, Salt Spring Island (CA)

(73) Assignee: LANG FAMILY TRUST, Leawood, KS (US)

( * ) Notice: Subject to any disclaimer, the term of this patent is extended or adjusted under 35 U.S.C. 154(b) by 0 days.

(21) Appl. No.: 19/238,414

(22) Filed: Jun. 14, 2025

(65) Prior Publication Data

US 2026/0031247 A1      Jan. 29, 2026

Related U.S. Application Data

(63) Continuation-in-part of application No. 18/949,993, filed on Nov. 16, 2024, now Pat. No. 12,417,856, (Continued)

(51) Int. Cl.
G21C 17/032    (2006.01)
G21C 7/32      (2006.01)
G21C 17/022    (2006.01)

(52) U.S. Cl.
CPC ............ G21C 17/032 (2013.01); G21C 7/32 (2013.01); G21C 17/022 (2013.01); *Y02E 30/30* (2013.01)

(58) Field of Classification Search
CPC ...... G21C 17/032; G21C 7/32; G21C 17/022; Y02E 30/30
See application file for complete search history.

(56) References Cited

U.S. PATENT DOCUMENTS 6,584,429 B1    6/2003 Lang
6,799,146 B1    9/2004 Lang
(Continued)

FOREIGN PATENT DOCUMENTS

EP          2510441 B1 *  5/2021   ............. F01K 13/02

OTHER PUBLICATIONS

Leo Beltracchi; Energy, Mass, Model-Based Displays, and Memory Recall; Jan. 19, 1989; IEEE Transactions on Nuclear Science; vol. 36, pp. 1367-1382 (Year: 1989).*
(Continued)

*Primary Examiner* — Michael C Zarroli

(57)          ABSTRACT

This invention discloses a computer apparatus whose instructions describe a process which analyzes system entropy flows, irreversible losses and Carnot reversibilities associated with heat exchangers used in thermal engines. Irreversible losses include those from shell and tube heat exchangers, and those from the shell-side of heat exchangers such as condensers. This disclosure teaches revision to the classic Carnot Engine resulting in an Exergetic Engine. The Exergetic Engine was created by recognizing true thermodynamic irreversibility associated with any heat exchanger is determined by the summation of its internal exergy flows. This leads to a correction of Sadi Carnot's $T_{Hot}$. For the nuclear engine, his $T_{Cold}$ is redefined as a Fixed $T_{Ref}$ dependent on neutronic constants and reactor coolant properties. Correcting his 200 year-old teachings produce an irreversible loss and an Exergetic Reversibility applicable to any heat exchanger used in any thermal engine.

32 Claims, 3 Drawing Sheets

The Exergetic Engine (Shell & Tube)

$T_{CDS-Corr} = T_{CDS} + \Delta T_{Corr}$ $R_{Shell} = + [T_{Ref}/T_{CDS-Corr}]Q_{REJ}$ $I_{Shell} = + [1 - T_{Ref}/T_{CDS-Corr}]Q_{REJ}$ $R_{Tube} = + [1 - T_{Ref}/T_{CDS-Corr}]\varepsilon_{Cond}Q_{REJ} - Q_{REJ}$ $I_{Tube} = - [1 - T_{Ref}/T_{CDS-Corr}]\varepsilon_{Cond}Q_{REJ}$

Related U.S. Application Data which is a continuation of application No. 18/444,
473, filed on Feb. 16, 2024, now Pat. No. 12,198,822.

(56) References Cited

U.S. PATENT DOCUMENTS

| | | | |
|---|---|---|---|
| 7,809,526 | B1 | 10/2010 | Lang |
| 12,198,822 | B2 | 1/2025 | Lang |

OTHER PUBLICATIONS

FD Lang, "Monitoring and Improving Coal-Fired Power Plants Using the Input/Loss Method—Part V", Proceedings of the 2007 ASME Power Conference, POWER2007-22009.

FD Lang, "Errors in Boiler Efficiency Standards", Proceedings of the 2009, ASME Power Conference, POWER2009-81221.

FD Lang and KF Horn, "Practical Experience with Second Law Power Plant Monitoring", Proce. of the Florence World Energy Research Symposium (Flowers '92), Italy, Jun. 7-12, 1992.

FD Lang, "The Nuclear Second Law, Part I: Engineering," Independent research, Rev.34D, via: https://www.ResearchGate.net/publication/391672829.

S. Glasstone & A. Sesonske, "Nuclear Reactor Engineering", D. Van Nostrand Co., NY, 1963; pp. 614-616.

* cited by examiner

The Exergetic Engine (Shell & Tube)

The Exergetic Engine (Shell Loss)

$$\Delta g_{\Delta P\text{-Corr}} = g_{RVI} - g(P_{RCI}, h_{RVI}, T_{Ref})$$

$$\Delta G_{RCQ\text{-Corr}} = m_{RV}(\Delta g_{RCY} + \Delta g_{\Delta P\text{-Corr}})$$

$$T_{RVI\text{-Corr}} = T_{RVI} + \Delta T_{Corr}$$

$$= T_{RVI} + T_{Ref} Q_{RV\text{-Loss}} / (Q_{RV\text{-Loss}} + \Delta G_{RCQ\text{-Corr}})$$

Thermodynamic Laws

Bases for Second Law Equations:

Bases for First Law Equations:

COMPUTER APPARATUS FOR MONITORING AND VERIFYING NUCLEAR AND FOSSIL POWER PLANT HEAT LOSSES BASED ON THE REVISED NCV METHOD

CROSS-REFERENCE TO RELATED APPLICATIONS

This application is being filed as a Continuation-In-Part of U.S. Utility application Ser. No. 18/949,993 ('993) filed Nov. 16, 2024; '993 was issued as U.S. Pat. No. 12,417,856 ('856) on Sep. 16, 2025; '993 was filed as a Continuation of U.S. Utility application Ser. No. 18/444,473 ('473) filed Feb. 16, 2024; '473 was issued as U.S. Pat. No. 12,198,822 ('822) on Jan. 14, 2025; '993, '856, '473 and '822 are hereby incorporated by reference in their entireties including approved corrections and for all purposes.

COPYRIGHT NOTICE

BACKGROUND OF THE INVENTION

Field of the Invention

This invention discloses a computer apparatus which greatly improves the analysis of heat losses from nuclear and fossil-fired power plants. Said heat losses include those from a shell and tube heat exchanger with an energy flow (i.e., a heat loss) to the local environment, or a heat exchanger whose thermodynamic boundary only includes one-side of the heat exchanger (such the tube-side of a fossil-fired Steam Generator providing steam to a Turbine Cycle, or the shell-side of a condenser which loses an energy flow to the local environment). The understanding of any thermal engine lies with either understanding "inputs" and the useful power output, or understanding heat losses. This disclosure focuses on heat losses, given use of corrections to the Carnot Engine, and Second Law techniques involving the flow of entropy. Further, it provides verification of that understanding thereby providing the system operator with actionable information. A significant feature of said process is the use of an "Exergetic Engine" which, with high accuracy, allows unique evaluation of heat exchanger thermodynamic losses. In the process of verifying irreversible losses, this disclosure teaches the analysis of a thermal engine's entropy flows. These are based on First Law less Second Law system descriptions. The verification process leads to comparing Entropy Flows and their ratios to those associated with known neutronic and thermodynamic standards (e.g., electrical generation, the Inertial Conversion Factor and/or system data having known accuracy). For the nuclear engine, verification means to compare a computed Inertial Conversion Factor ($\Xi$) versus its equivalence based on thermodynamic properties. E is based on the ratio of neutrino versus total MeV release (thus constant for a given burnup and whose min/max values are known). For the fossil engine, verification means to use one or more of the four Input/Loss Method's verification techniques provided their major components (e.g., the condenser and system heat exchangers)

employ the measures taught here, that is corRECting $T_{Hot}$ for $\Sigma_{Shell}$ $mg_k$ and $\Delta T_{SCY}$ effects. For discussion of the four Input/Loss verification techniques, see the reference: F D Lang, "Monitoring and Improving Coal-Fired Power Plants Using the Input/Loss Method—Part V", *Proceedings of the* 2007 *ASME Power Conference*, POWER2007-22009.

One of the most important processes of any thermal engine is its heat rejection (an energy flow) to the local environment. Two hundred years ago Sadi Carnot taught that the "greatest caloric production" associated with any thermal engine is a $f(T_{Hot}-T_{Cold})$ operating between thermal reservoirs. His classic Carnot Engine consisted of two isothermal processes connected to two adiabatic processes, operating reversibly. This was the basis for assuming that the irreversible loss associated with any thermal engine's heat rejection ($Q_{Loss}$) to its environment is the Carnot Engine's theoretical caloric production: $[1-T_{Cold}/T_{Hot}]Q_{Loss}$; yet this is not correct. To correct, this disclosure teaches the application of an "Exergetic Engine". Of course, both the Carnot Engine and the Exergetic Engine are theoretical, they are computational devices which produce an irreversible loss (and thus a reversibility), and for the Exergetic Engine, after correction, produces an Exergetic Reversibility.

Although Exergetic Engine's roots are embedded in Carnot's device, it is uniquely modified by recognizing that the true thermodynamic irreversibility associated with all shell and tube heat exchangers (HTX) is given by the relationship: $I_{HTX}=-[\Sigma_{Shell}$ $(mg)_k+\Sigma_{Tube}$ $(mg)_{kk}]$. Sadi Carnot's interpretation of the effects of a $Q_{HTX}$, a heat transfer $[-\Sigma_{Shell}$ $(mh)_k]$, is governed by his relationship $[1-T_{Ref}/T_{Hot}]Q_{HTX}$; the question then proposed is:

$$I_{HTX} \overset{?}{\Leftrightarrow} [1 - T_{Ref}/T_{Hot}]Q_{HTX}.$$

In a 1824 world the questioned relationship would be equated; in the world of this disclosure, it is not. It is now seen as a 200 year-old error. There are two related reasons for non-equivalence. First, "exergy" must satisfy the thermodynamic equation of state: $Tds=dh-vdp$; thus: $T=[\partial h/\partial s]_P$ which will equal Carnot's $T_{Hot}$ only by happenstance. Second, the $\Sigma_{Shell}$ $(mh)_k$ term represents the summation of all inlet and outlet streams ("k"); the outlet streams were ignored by Carnot. $T_{Hot}$ is corrected so that exergy flows and Carnot's processing of $Q_{HTX}$ are always equivalent. Correcting Carnot's teachings results in computing a highly accurate irreversible loss and an Exergetic Reversibility, thereby improving the thermodynamic understanding of thermal engines. With an improved understanding the system operator has information to protect the public and/or to instigate actions to improve thermal efficiencies.

Description of Related Art

Heat Exchangers (e.g., condensers) are integral to all Regenerative Rankine Cycles; they are employed by both nuclear and fossil-fired thermal engines. The genesis for this work lies with the Neutronics/calorimetrics/Verification (NCV) Method which taught new monitoring techniques for both thermal performance and safe operation of nuclear power plants . . . the complete system from neutronics to condenser heat rejection. Its descriptive engineering was based on the Second Law of thermodynamics' exergy analysis. Foundations of the NCV Method lead to the development of Exergetic Reversibilities (e.g., condenser analytics), Entropy Flows, and thermal performance technologies which are disclosed herein. Fossil-fire power plant condensers are also directly impacted. The NCV Method was granted U.S. Pat. No. 12,198,822 on Jan. 14, 2025, and with approved corrections hereinafter '822. The NCV Method was also granted U.S. Pat. No. 12,417,856 on Sep. 16, 2025, and with approved corrections hereinafter '856.

Assumed throughout is that for a shell and tube heat exchanger, its shell-side is the hotter fluid (i.e., associated with $T_{Hot}$) being cooled by heating the tube-side. Although conventional, this is not universal; as used in a PWR, its Steam Generator is designed to cool the tube-side (reactor coolant) by heating the shell thereby generating a steam supply. Throughout this disclosure, "shell-side" is defined as the fluid being cooled, "tube-side" is defined as the fluid being heated. If, in a given design the tube-side is the hotter fluid, then nomenclature is reverse.

Common art associated with the thermal performance monitoring of condensers includes the following concepts: the summation of a heat exchanger's exergy flows (outlets less inlets) herein defines a "true thermodynamic irreversible loss,"$-[\Sigma_{Shell}(mg)_k+\Sigma_{Tube}(mg)_{kk}]$; the use of heat exchanger effectiveness (based on exergy analysis) to eliminate tube-side conditions; use of the fossil fuel's calorimetric temperature ($T_{CAL}$); and proper use of the reference temperature used in exergy analysis. The concept using heat exchanger effectiveness was first used by this inventor in the early 2000s when monitoring fossil-fired power plants. He lectured on this concept to power plant staffs in the United States, Ireland and Greece, but does not recall publishing; thus it is considered common art. The thermodynamic base for the Carnot Engine was developed by Nicolas Sadi Carnot in 1824; it has also been termed the "Carnot Thermal Engine". Carnot's principles laid the foundations for the Second Law of thermodynamics in that no thermal engine can be more efficient than a reversible one operating between $T_{Hot}$ and $T_{Cold}$ reservoirs. It has been used for two hundred years without modification. For example, when applied to a thermal engine's condenser, there is no known art which has not taken $T_{Hot}$ as the saturation temperature of the fluid being condensed. This is in error as $T_{Hot}$ requires correction. $T_{Cold}$ has typically been taken as the condenser's tube-side inlet temperature (the coldest reservoir seen by the fossil engine). When applied to a nuclear power plant, this is also an error.

For any heat exchanger its irreversible loss is given by $I_{HTX}$. If the shell-side fluid is heating the tube-side (e.g., shell-side steam is being condensed), then the sum of shell exergy flows must be negative, and numerically greater than the tube-side's increase in exergy flow. Thus, a net negative exergy flow represents an $I_{Cond}>0.0$; if this is not the case the heat exchanger violates the Second Law (heat would flow from $T_{Cold}$ to $T_{Hot}$). Second Law effectiveness is logically defined as: $\varepsilon_{Cond}=-m\Delta g_{Tube}/\Sigma_{Shell}(mg)_k$. Thus, $\varepsilon_{Cond}\le1.0$ and applies universally.

Use of the Carnot Engine when applied to any heat loss to the local environment is clearly common art, it has been in use since the industrial revolution. Indeed, thermodynamics for years have pointed out that Second Law exergy analysis of power plants indicates that condensers in a fossil engine have irreversible losses <5% of the total; this compared to condensers rejecting 60% to 70% of system supplied energy flows. This disclosure teaches that small irreversible losses in certain components can have a large impact on entropy flows, and thus affect the thermodynamic understanding of the thermal engine; this is especially true for a nuclear engine.

Discussion of the classic Carnot Engine is required since this disclosure presents serious variations to the historic Engine that are required to greatly improve the thermodynamic understanding of heat exchangers in general, and condensers in particular. The classic Carnot Engine is commonly used to develop a "loss power". This term is associated with the Engine's production of the highest flow of availability (an exergy flow) possible, given a theoretical, cyclic operation on an energy flow when in transference to a thermal reservoir. This reservoir is assumed of practically infinite size and physically attached to the system. It is maintained at constant temperature which, for a condenser, was commonly taken as the tube-side inlet (the system's physical attachment to the coldest reservoir available in the local environment and attached to the exchanger).

There are two related technologies, both considered common art, which are relevant to this disclosure. These include the thermodynamics of fossil-fired Steam Generators and related Fossil Fuel Consumption Indices (FFCI) developed as part of the Input/Loss Method. All calorimetric values (heating values) of fossil fuels, of course, are dependent on a "calorimetric temperature", $T_{CAL}$. When computing the Heat of Combustion for a gaseous fuel, $$\Delta H_f^0$$

are well defined standards at 25° C. and 1.0 Bar. For any other $T_{Ref}$, $$\Delta H_f^T$$

can be computed (although $$\Delta H_{f-CO2}^T \ \& \ \Delta H_{f-SO2}^T$$

vary little with temperature, not so with $$\Delta H_{f-H2O}^T).$$

When using all adiabatic or isoperibol bomb calorimeter to evaluate solid or liquid fuels its reference is, again, $T_{CAL}$. It is this temperature at which the bomb's water jacket is kept in an equilibrium state; a constant temperature chosen by the laboratory technician. Although one can easily compute, with high accuracy, the ideal products at $T_{CAL}$:

$$\Delta H_{f-CO2}^T, \Delta H_{f-SO2}^T, \Delta H_{f-H2O}^T,$$

etc.; it is not possible to compute a solid or liquid fuel reactant $$\Delta H_{f-RX}^T$$

(i.e., the chemistry or coals and fuel oils are too complex, $$\Delta H^T_{f-RX}$$

can only be evaluated by test). Thus, a basis for a "Products less Reactants" approach is created to compute a high accuracy boiler efficiency, all at constant calorimetric temperature (thus, $$\Delta H^T_{f-RX}$$

is back-calculated given a measured Heat of Combustion and computed ideal products). This approach and the Input/ Loss Method were granted a number of United States and foreign patents, significant ones include: for boiler efficiency, U.S. Pat. No. 6,584,429 issued on Jun. 24, 2003, corrected on Sep. 9, 2003 (hereinafter '429); and for the Input/Loss Method, U.S. Pat. No. 7,809,526 issued on Oct. 5, 2010 (hereinafter '526). Miscellaneous US Patents teaching a variety of Input/Loss technologies include: 6522994, 6560563, 6651035, 6691054, 6714877, 6745152, 6810358, 6868368, 6873933, 7039555, 7040095, 7328132 and 8091361. No patent issued to this inventor as related to the Input/Loss Method, or provisional or utility application related to the NCV Method, prior to '822, employs entropy flows, Exergetic Reversibilities, or an Exergetic Engine (leading to highly accurate irreversibilities) in its methodologies. In summary for the fossil engine, if the calorimetric temperature is not properly employed for the analysis of the fossil engine, the First Law is guaranteed not to conserve. Without conservation of energy flows, the use of Second Law exergy analysis on any thermal engine, with or without use of an Exergetic Engine, is a fool's errand.

Regarding the use of $T_{CAL}$, note that the latent heat of water at an As-Fired temperature is rarely the bomb calorimetric's value. The system's water energy flows will not be conserved given the combustion's water energy, wet combustion air and air leakage psychometrics (ASHRE uses 0.0° F. for its gas property reference), water ingress, etc. all have differing thermodynamic dead states versus the fuel's $T_{CAL}$; for reference see: F D Lang, "Errors in Boiler Efficiency Standards", *Proceedings of the* 2009, *ASME Power Conference*, POWER2009-81221. In summary, for the fossil-fired power plant $T_{CAL}$ is set by the gaseous fuel analyst, or, for solid or liquid fuels, by the laboratory technician.

Also, relevant prior art includes the Input/Loss Method's Second Law exergy analysis used as a base for monitoring fossil-fired power plants. Input/Loss' development of a fossil-fired $G_{IN}$ is considered common art for the fossil engine:

$$G_{IN} \equiv P_{GEN} + I_n \qquad \text{(BG-1)}$$

$$= m_{AF}g_{Fuel} + m_{Air}g_{Air} + \sum G_{Misc} + \sum P_{Pump} + \sum P_{Fan} \qquad \text{(BG-2)}$$

Computing fuel exergy, $g_{Fuel}$, is complex as it involves converting the fuel's Heat of Combustion to a potential (an exergy). This involves the As-Fired hydrocarbon less the effect of all elementary constituents. Effect of elementary constituents means evaluating ideal combustion products less reactants, all based on $\Delta h_j$ less $T_{Ref}\Delta s_j$ molar terms. Miscellaneous exergy flow, $\Sigma G_{Misc}$, includes soot blowing, sorbent injection and Steam Generator tube leakage all flowing into the combustion space. The source of First Law energy flow into a fossil engine is given as the heating value (higher or lower) plus a Firing Correction term; e.g., HHVP+HBC. The Firing Correction corrects only the reactants to the same thermodynamic base established by the fuel's calorimetric temperature ($T_{CAL}$) including energy flows for combustion air, soot blowing, etc. Thus, an As-Fired hydrocarbon with its combustion air, leakages, etc., all enter the combustion space under the (corrected) same base. Combustion losses cannot affect the denominator in a boiler efficiency statement. Eq. (BG-1) lead to Fossil Fuel Consumption Indices (FFCI). References for hydrocarbon's $G_{IN}$ and early development of FFCI see: F D Lang and K F Horn, "Practical Experience with Second Law Power Plant Monitoring", *Proceedings of the Florence World Energy Research Symposium* (Flowers '92), Firenze, Italy, Jun. 7-12, 1992, Ed. Sergio S. Stecco & Michael J. Moran, later published in the U.S in English, also in Chinese, Italian, etc.; further development involving dynamic metrics lead to U.S. Pat. No. 6,799,146 issued on Sep. 28, 2004, corrected on Apr. 26, 2005. Recall that '822 teaches Fission Consumption Indices (FCI) via Col. 35, Line 32 to Col. 36, Line 39, patterned after FFCIs. FFCIs and FCIs are herein defined as "Consumption Indices".

In summary, the use of a heat exchanger, or any thermal device losing heat to its local environment, requires a high accuracy computing vehicle. Such accuracy includes numerical verification. There is no known art which redefines the meaning of Carnot's $T_{Hot}$ and $T_{Cold}$ temperatures. There is no known art which develops a method of using condenser reversibilities to identify degraded components within a thermal engine which results in an action instigated by the power plant operator based on that identification.

BRIEF SUMMARY OF THE INVENTION

This invention discloses a theoretical Exergetic Engine which allows computation of irreversible and reversible quantities associated any physical heat exchanger device which cools a fluid by heating another a fluid. The Exergetic Engine may also be applied to vessel convective and/or thermal radiative losses to the local environment. The physical device (say a condenser) is commonly designed in a tube-in-shell arrangement; typically, the tube-side is being heated. The shell-side is cooled and usually processes multiple fluid flows inputs with different state properties (for a condenser, its shell inlet flows principally containing saturated steam, resulting in a condensed shell outlet flow). When applying First Law conservation of energy flows— given a nuclear or fossil engine—a condenser's heat rejection ($Q_{REJ}$) is simply dissipated in the local environment, a loss from the system (from a thermal engine's standpoint, thermodynamically, the "where" such heat rejection is dissipated is not relevant . . . we heat oceans and rivers to make electricity). Applying a classic Carnot Engine or the Exergetic Engine to any First Law study has no meaning. However, for any thermal engine, application of a classic Carnot Engine or an Exergetic Engine, the loss of $Q_{REJ}$ from the system-given its resultant loss of availability—is, by definition, an irreversible loss. This loss is relative to a reference temperature, $T_{Ref}$ (for the classic Carnot Engine $T_{Ref}$ is assumed to be $T_{Cold}$, the coldest reservoir available). As defined herein, the phrase "Floated $T_{Ref}$" is a reference temperature chosen by the analyst (e.g., the condenser's tube-side inlet temperature). Also defined herein, the phrase "Fixed $T_{Ref}$" is a reference temperature which is held constant having no relationship with a thermal reservoir. For example, the nuclear reference $T_{Ref}$, based on the Inertial Conversion Factor ($\Xi$) of Eq. (9) and defined by Eq. (10) in '856, is a Fixed $T_{Ref}$.

With such background, this disclosure teaches that for any component exchanging heat (i.e., exchanging exergy flows), that $T_{Hot}$ must be corrected with a $\Delta T_{Corr}$ derived from the true thermodynamic irreversibility, $I_{HTX}$. For the vast majority of condenser designs, their inlet and outlet tube-side consist of a single flow, whereas the shell-side comprises multiple inlets and a single outlet. For example, a condenser's principal inlet flow is the low-pressure turbine's exhaust (at saturation, $T_{CDS}$), but its shell also receives input streams comprising: return feedwater heater drains, turbine seals, valve by-pass leakages, heat exchanger blow-down flows, etc. If condensing saturated steam at $T_{CDS}$, correction is made by subtracting a Carnot-based loss from $I_{HTX}$, then solving for a corrected $T_{Hot}$ (i.e., $T_{CDX}$), where: $T_{CDX}=T_{CDS}+\Delta T_{Corr}$. In addition, when evaluating condensers, it becomes uniquely apparent that the system's flow of entropy reveals that accurately computing a condenser reversible gain (based on $I_{Cond}$) has a huge impact on understanding a power plant's thermal performance.

A technical paper, recently published, is available which explains both the NCV Method and presents numerical examples of system balances and use of the Exergetic Engine. Its reference is: F D Lang, "The Nuclear Second Law, Part I: Engineering," published as independent research available at: https://doi.org/10.12688/nuclscitech-nolopenres.17675.1.

DETAILED DESCRIPTION OF THE INVENTION

Figure 1A:
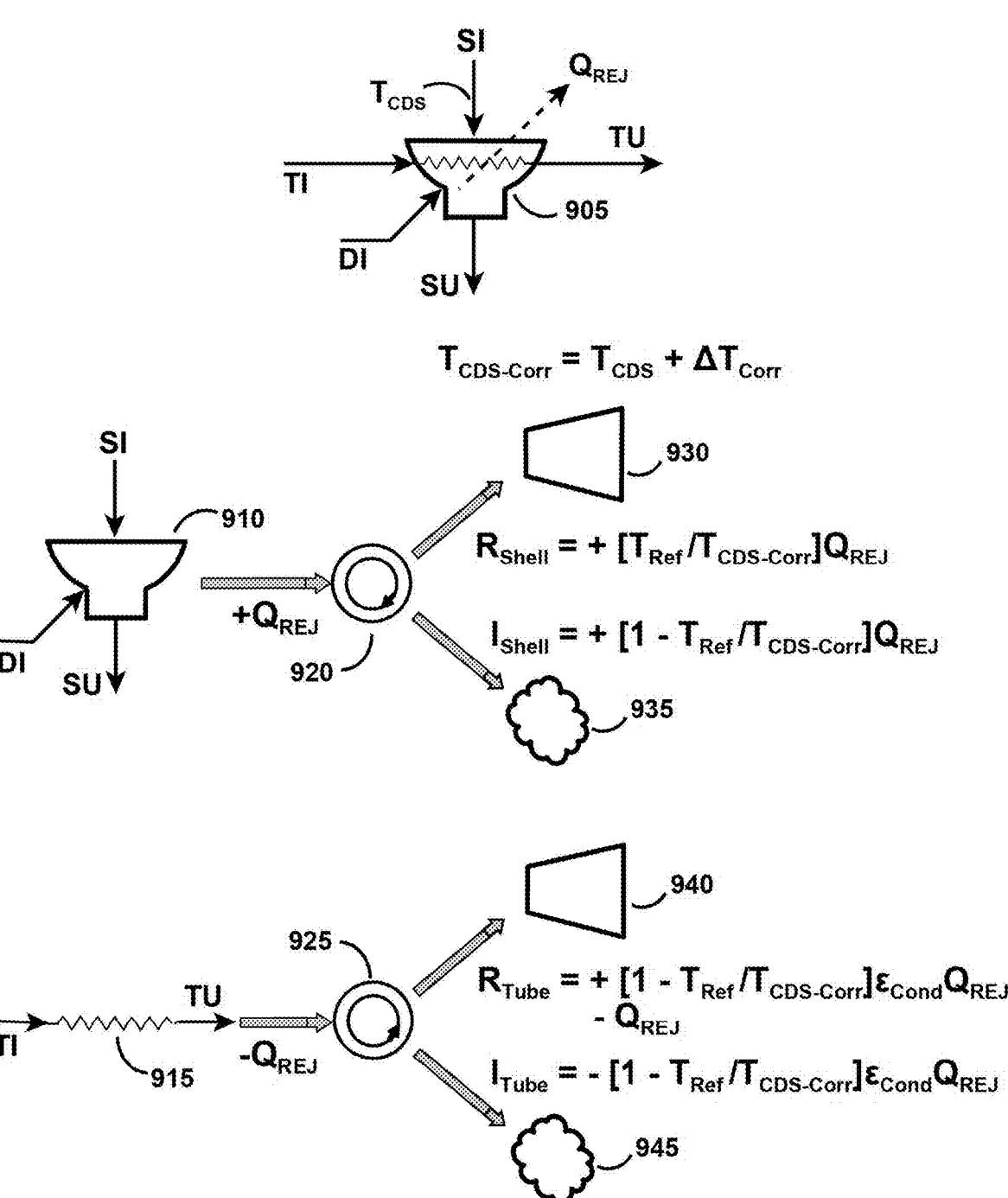
FIG. 1A is a representation of two Exergetic Engines used to describe the irreversible effects of a heat exchanger's energy flow to its local environment, given the exchanger is treated, separately, as shell and tube components, included is nomenclature of fluid inlets and outlets for each.

To assure an appropriate teaching, descriptions of the computer apparatus are divided into the following subsections. The first two present Definitions of Terms and Typical Units of Measure, and the important Meaning of Terms. The remaining subsections, representing the bulk of the teachings, includes: The Exergetic Engine, System Entropy Flow, Verification of a Nuclear Engine's Entropy Flows, and Verification of a Fossil Engine's Entropy Flows.

Definitions of Terms and Typical Units of Measure

---

System Terms:

---

$FCI_{Loss-n}$ or $FFCI_{Loss-n}$ = Fission Consumption Index or Fossil Fuel Consumption Index for the $n^{th}$ irreversible loss; unitless $FCI_{Power}$ or $FFCI_{Power}$ = Fission/Fossil Fuel Consumption Index for useful power output as a process; unitless.

$g \equiv (h - h_{Ref}) - T_{Ref}(s - s_{Ref})$, fluid specific exergy (also termed "available energy"); Btu/lbm.

$G_{IN}$ = Total exergy flow input to a thermal engine (e.g., nuclear & shaft power inputs); Btu/hr.

$\Delta g_{\Delta P-Corr} \equiv [g_{STI} - g(P_{SCI}, h_{STI}, T_{Ref})]$; for example, the exergy correction for a $\Delta P_{SCY}$ effect, see Eq.(14A); Btu/lbm -continued

---

System Terms:

---

$\Delta H^0_{f-m}$ = Heat of Formation of substance "m" at the standard state, 25°C. & 1.0 Bar; Btu/lb-mole.

$\Delta H^T_{f-m}$ = Heat of Formation of substance "m" at temperature T; Btu/lb-mole.

$h_{Ref}$ = Reference fluid specific enthalpy used for exergy's definition: f ($P_{Ref}$, x = 0.0); Btu/lbm.

$I_k$ = Irreversibility of the $k^{th}$ process; Btu/hr m or $\dot{m}$ = Mass flow of fluid; lbm/hr.

$m\Delta g$ or $\dot{m}\Delta g$ = Exergy flow, also termed available power; Btu/hr.

$m\Delta h$ or $\dot{m}\Delta h$ = Energy flow, also termed thermal power; Btu/hr.

$P_{Cond}$ = Condenser's shell-side indicated pressure; psiA.

$P_{FWP-Aux}$ = Energy flow credit for a TC Auxiliary Turbine driving a FW pump; Btu/hr.

$P_{GEN-REF}$ = Reference useful power output delivered to the turbine-generator; Btu/hr.

$P_{GEN}$ = Useful power output delivered to the turbine-generator; Btu/hr.

$P_{X-ii}$ = Motive power delivered to the $ii^{th}$ individual X subsystem pump; Btu/hr.

$P_{Ref}$ = Reference pressure for exergy analysis: $P_{Ref}$= f ($T_{Ref}$, X = 0.0); psiA.

$Q_{CTP}$ = Core Thermal Power, an energy flow, defined herein; Btu/hr.

$Q_{Y-Loss}$ = Vessel heat loss to the local environment from subsystem Y; Btu/hr.

$Q_{REC}$ = Recoverable exergy flow from fissile materials; Btu/hr.

$Q_{REJ}$ = Condenser heat rejection from the TC, an energy flow; Btu/hr.

$Q_{SG}$ = Net energy flow delivered to a SG from combustion or nuclear power; Btu/hr.

$Q_{TCQ}$ = Net energy flow delivered to the Turbine Cycle including pump power; Btu/hr.

$R_k$ = Exergetic Reversibility of the $k^{th}$ process; Btu/hr $s_{Ref}$ = Reference fluid specific entropy used for exergy analysis: f ($P_{Ref}$, $h_{Ref}$); Btu $R^{-1}$ $1bm^{-1}$.

$\dot{S}_{SYS}$ = System Entropy Flow which consist either the $\dot{S}_{Nucl}$ term used for the nuclear engine or the $\dot{S}_{Foss-SG}$ term used for the fossil-fired SG; Btu/°R-hr $T_Y$ = Traditional motive temperature associated with an exchanger's heat loss to the local environment, also termed "Carnot's $T_{Hot}$"; e.g., the Condenser's indicated saturated shell-side temperature, $T_{CDS}$, is defined as a $T_Y$, °F.

$T_{Y-Corr}$ = Correction to $T_Y$ (correction of Carnot's $T_{Hot}$ ) temperature; °F.

$\equiv T_Y + \Delta T_{Corr}$ $\Delta T_{Corr}$ = Correction to the Exergetic Engine's $T_{Hot}$ for compliance with Eq.(1); °F. or °R.

$T_{Hot}$ = Traditionally the hottest reservoir seen by a Carnot Engine; as used herein, the motive temperature associated with an exchanger's $Q_{HTX}$; °F. or °R.

$T_{Ref}$ = Reference temperature for exergy analysis, can be defined by user for a fossil engine, or defined by Eq.(10A) in '856 for the nuclear engine; °F. or °R.

$T_{Sat}$ = Saturation temperature of the condensing side of a heat exchanger; °F. or °R.

$V_{Fuel}$ = Volume of nuclear fuel consistent with the total macroscopic cross section; $cm^3$.

x = Steam quality; mass fraction.

$\epsilon$ = Second Law effectiveness (some text books use Second Law efficiency); unitless.

$\Xi$ = Inertial Conversion Factor (ICF) defined by Eq.(9B) of '856; e.g., $\Xi_{U235}$ is the ICF for $^{235}U$ [af($\overline{v}_{TNU-U235}/\overline{v}_{TOT-U235}$)], $\Xi_{U233}$ is the ICF for $^{233}U$, etc .; unitless.

$\overline{v}_{XX}$ = Average exergy per fission release [this symbol is not $^1n_0$/Fission]; MeV/Fission.

$\Sigma$ = Summation of terms.

$\Sigma_{F-j}$ = Macroscopic fission cross section for isotope j; $cm^{-1}$.

$\Phi_{TH}$ = Average neutron flux numerically satisfying the Calorimetrics Model; $^1n_0$ $cm^{-2}$ $sec^{-1}$.

Subscripts and Abbreviations hh and ii denote indices for complete components with the system (i.e., not interfaced with the local environment); k and kk denote indices associated with all streams entering or exiting a single component (at the point of contact).

AF=As-Fired, referring to fossil combustion.

CD=The heat engine's Condenser.

CDP=Condensate system pump.

CDS=Condenser's saturation temperature, a function of its shell's operating pressure.

CTP=Core Thermal Power.

FCI=Fission Consumption Index.

FFCI=Fossil Fuel Consumption Index.

FWP=Feedwater system pump (i.e., a non-Condensate pumps).

HHVP+HBC=As-Fired fuel enthalpy (Heat Value+Firing Correction) for fossil combustion.

HP=High Pressure

LP=Low Pressure

PWR=Pressurized Water Reactor.

RV=Reactor Vessel.

RVP=Reactor Vessel pump.

SG=Steam Generator.

SGF=Fossil-Fired Steam Generator.

SGN=Nuclear Steam Generator (associated with a PWR).

TC=Turbine Cycle.

TUR=Main steam turbine [the $k4^{th}$ HP or $k5^{th}$ LP stage group], or the Auxiliary Turbine [Aux].

WF=Working Fluid

X=Indication of a sub-system pump [RVP, FWP or CDP], or a steam turbine [TUR].

XX=Indication of a fission release defined in TABLE 3 and discussion; [e.g., XX=REC].

Y=Indication of a vessel's heat loss associated with a sub-system [RV, SG, CD or TC] and in coordination with the vessel's specific location: RVI⇒inlet to the RV's outer flow annulus; STI⇒inlet to a nuclear SG's outer flow annulus bearing FW; CDS ⇒Condenser's (CD) shell; TC⇒an accumulation of TC vessels].

Subscripts Referencing a Fluid's State Property or Flow [e.g., Hrw⇒Final FW Enthalpy]:

FW=Final feedwater state exiting the contractual TC.

RCI=Reactor core inlet (downstream from RVI).

RCU=Reactor core outlet (upstream from RV outlet nozzle).

RVI=Reactor Vessel inlet nozzle.

SCI=Steam Generator TC-side coolant inlet to the active heat exchanger region.

STI=Steam Generator TC-side vessel coolant inlet.

TH=Inlet to the TC Throttle Valve.

Subscripts Referencing Differences Between Quantities [e.g., $\Delta h_{RCX}=h_{RCU}-h_{RCI}$]:

$$RCX\;[\,=\,]\;RCU - RCI$$

$$RCY\;[\,=\,]\;RCI - RVI$$

$$SCY\;[\,=\,]\;SCI - STI$$

$$TCQ\;[\,=\,]\;TH - FW$$

Meaning of Terms

The term "Operating Parameters" used within the general scope and spirit of the present invention, is broadly defined as common off- and on-line data obtained from a thermal engine. It includes a set of Off-Line Operating Parameters and a set of On-Line Operating Parameters. These terms are also discussed in '822, in the context of its NCV Model, in Col. 15, Line 38 to Col. 17, Line 31; and in Col. 52, Lines 28-45; and elsewhere in '822. These terms share the same meaning when employed for fossil-fired power plants (for a visual explanation of Operating Parameters applicable for the Input/Loss Method see '429, FIG. 19 and its associated discussion. The term "thermal engine" describes either a single component or a process, or a collection of components and/or processes which: 1) collectively, is hotter than its local environment; 2) produces a useful output such as an energy flow for space heating, and/or shaft power (e.g., driving a turbine-generator set); and 3) has a heat loss to its environment. The term "thermal engine", traditionally, applies to any type of power plant, internal combustion engine, jet engine, refrigeration system, Steam Generator, and the like. However, integral to this disclosure is discussion of the historic Carnot Engine (also termed the Carnot Heat Engine) and errors made when it is used in a traditional manner; when corrected, an Exergetic Engine results. Thus "thermal engine", in addition to the traditional meanings, also comprises the Exergetic Engine. The term "nuclear engine" refers to a thermal engine based on nuclear fission or fusion. The term "fossil engine" refers to a thermal engine based on the combustion of fossil fuels (e.g., fossil-fired, fossil-fired engine, etc.). The term "condenser" is a hardware device which condenses a fluid to its liquid state so that it can then be economically pumped to a higher pressure and returned to a heating process resulting in production of a useful output. It is traditionally used in the Regenerative Rankine Cycle, which was developed during the industrial revolution, and used with all nuclear and fossil-fired power plants. For all thermal engines: the $f[(T_{Ref}/T_{Y-Corr})Q_{Y-Loss}]$ quantity, given $Q_{Y-Loss}$ is an energy flow to the local environment, is herein defined as a "Carnot Exergetic Reversibility"; the term $f[(mT_{Ref}\Delta s)_{ii}]$ is defined as "Component Entropy Flow(s)" referring to complete components with a system; and the $[m_{RV}\,T_{Ref}\Delta s_{RCX}]$ and $\Sigma_{SGF}\,(mT_{Ref}\Delta s)_i$ terms define, respectively, a nuclear and fossil-fired generated "System Entropy Flow" (algebraically termed, generically, $\dot{S}_{Sys}$, which refers to $\dot{S}_{Nucl}$ or $\dot{S}_{Foss-SG}$).

The Exergetic Engine

The Exergetic Engine is applicable for the analysis of a shell and tube heat exchanger or for a thermal device with heat loss to the local environment. It is obvious that the true thermodynamic irreversibility describes any shell and tube heat exchanger as a complete component, both shell and tube states and flows are known; e.g., a condenser interfacing with both a LP turbine's exhaust and its tertiary circulatory cooling system. However, there are numerous examples of shell- or tube-side exchangers, with heat losses to the environment, which must be analyzed not isolation but either as a shell- or tube-side only. Such examples include: a condenser whose working fluid is the shell-side (its tube-side being outside the Turbine Cycle's system boundary); the tube-side of a fossil-fired Steam Generator whose shell-side contains combustion gases (and which may be chosen as being outside the boundary). Miscellaneous heat exchangers within the system such as feedwater heaters, the Moisture Separator Reheater used in nuclear power plants and similar exchangers are treated as complete components. The following development describes a complete component (using a condenser as a generic component), followed by shell- or tube-side analysis.

When monitoring a condenser on-line, experience suggests that the only reliable parameters include: a computed heat rejection $Q_{REJ}$ (based on '822 NCV), the measured condenser pressure $P_{Cond}$ and the condenser effectiveness $E_{Cond}$. The Second Law thermal efficiency is termed "effectiveness," $\varepsilon_{Cond} = -m\Delta g_{Tube}/\Sigma_{Shell}\, mg_k$, is assumed known based on design, verified testing, and/or can be resolved using NCV's Verification Procedures (see '822). Historically it has been found from testing power plants that large commercial condenser $\varepsilon_{Cond}$ values are remarkably consistent as a function of $P_{Cond}$ (provided fouling has reached a steady condition). This said, individual condenser exergy flows are simply not knowable with any reasonable accuracy. This statement includes: the turbine's last stage exhaust state and mass flow; return drain flows including feedwater drains, turbine seals and the like; hot-well outlet mass flow; and is especially true for the condenser's tube-side conditions. Tube-side mass flow, and even fluid temperatures, are difficult to measure with any accuracy given very large pipes having stratified flow given no mixing, and without cross-pipe temperature measurements, etc.

Application of Second Law exergy analysis to the nuclear system creates subtle interpretations when using an Exergetic Engine versus the classic Carnot Engine . . . such interpretations arise from the computation of $I_{HTX}$ and the development of the nuclear Fixed $T_{Ref}$. Given application of Second Law exergy analysis, the Exergetic Engine produces the same numerical irreversible loss as the classic, provided both use the same $T_{Ref}$, and a $\Delta T_{Corr}=0.0$, are employed as addressed below; however, one needs to keep in mind the following underlying (and quite different) assumptions:

All heat exchanger shell-side exergy flows are used to develop a $\Delta T_{Corr}$ which corrects the shell's $T_{Hot}$, thus allowing equivalence between Eq. (1) and a Carnot Engine.

For a complete component, the physical heat exchanger is theoretically split into individual shell and tube portions, each of these interfacing with an Exergetic Engine processing $+Q_{REJ}$ for the shell-side and processing $-Q_{REJ}$ for the tube.

It is asserted that descriptions of Carnot's cyclic processes are unnecessary contrivances. The nuclear Exergetic Engine has no thermal reservoir, as it simply [converts] $Q_{REJ}$ to reversibilities and irreversibilities, done isothermally and adiabatically; thus for both shell and tube: $Q_{REJ} = |\,I_{Shell} + R_{Shell}\,| = |\,I_{Tube} + R_{Tube}\,|$.

The improved accuracy of the condenser's thermal performance is achieved by applying the Exergetic Engine to compute condenser reversibilities which are then compared to the System Entropy Flow (defined below) for identification of degradations arising from any thermal engine.

The Exergetic Engine is also applicable for determining a highly accurate irreversibility loss associated with an individual shell- or tube-side with a convective and/or radiative heat loss to its environment.

An Exergetic Engine can never be applied to nuclear radiation which is not captured by the system; loss power and reversible concepts if applied to such radiation have no meaning.

The nuclear Fixed $T_{Ref}$ as based on the Inertial Conversion Factor ($\Xi$), has meaning simply as a coupling mechanism between First and Second Law loss types; i.e., energy flows dispersed to the local environment and Second Law irreversible losses. Indeed, if $T_{Ref}$+f ($\Xi$) for the nuclear system, then both Laws fail when describing the nuclear engine.

In summary, application of the Exergetic Engine to a nuclear condenser means using a Fixed $T_{Ref}$ defined by Eq. (10) in '822 and '856. Application of the Exergetic Engine to a fossil condenser means using a Floated $T_{Ref}$. Application of the Exergetic Engine to an isolated Turbine Cycle means using either a Fixed $T_{Ref}$ or Floated $T_{Ref}$ dependent on its $G_{IN}$ source. The fossil engine's calorimetric temperature ($T_{CAL}$) is fixed by the analyst computing a gaseous fuel's Heat of Combustion, or by the laboratory technician operating a bomb calorimeter; if not properly used, valid First and Second Law fossil analyses are bogus.

As FIG. 1A suggests, two Exergetic Engines are placed, separately, between the shell loss and the tube gain, each processing $Q_{REJ}$. In FIG. 1A: TI & TU refer to tube inlet & outlet states and flow; SI, SU and DI are shell-side inlets, outlet and return drain inlet states and flows. $T_{CDS}$ is the saturation temperature as a $f(P_{Cond})$, traditionally it is defined as Carnot's $T_{Hot}$; $T_{CDX}$ is the corrected shell temperature (defined below). It is assumed that the condenser vessel proper has no appreciable convective loss. Note that the Exergetic Engine is acquiring a $+Q_{REJ}$ as an input, converting to $R_{Shell}$ and $I_{Shell}$ which net a $+Q_{REJ}$, thus a passive construct; the opposite signs apply to the tube-side.

The true thermodynamic irreversibility associated with any heat exchanger is given as the summation of all shell and tube exergy flows, Eq. (1). This expression indicates, for any heat exchanger, that the net of shell-side exergy flow (its absolute value) must always be greater than the tube-side exergy flow gain (i.e., using conventional outlet less inlet); a positive $I_{HTX}$ and thus the exchanger does not violate the Second Law. For convenience, the tube side is assumed to consist of single output and inlet connections.

$$I_{HTX} \equiv -\left[\sum\nolimits_{Shell} mg_k + m\Delta g_{Tube}\right] \tag{1}$$

There is subtlety in Eq. (1) versus the traditional Carnot Engine. Although Carnot's "greatest caloric production" is associated with a maximum temperature difference, the simple prima facie case is that an uncorrected Carnot $\Delta T_{MAX}$ has nothing in common with a properly computed irreversible loss. Eq. (1) governs all such losses and serves as a foundational base for Second Law exergy analysis involving heat exchangers; see '822 and '856 Eq. (51B). Violate Eq. (1) and one attempts heat transfer from $T_{Cold} \rightarrow T_{Hot}$. There is no prior art which teaches otherwise. In defense of Carnot, in 1824 the Second Law, irreversible loss, exergy analysis . . . were simply not developed concepts. In the simplest of terms, his Engine's $T_{Hot}$ is corrected to assure compliance with Eq. (1). For example, the notion that any chosen $T_{Cold}$ (say $T_{Cold} \geq T_{Hot}$) can produce a negative loss using the traditional $[1 - T_{Cold}/T_{Hot}]Q_{REJ}$, is, indeed, thwarted by Eq. (1). If the absolute net shell exergy flow is less than the tube-side increase, based on any assumed absolute $T_{Cold}$, then exchange of energy flow from shell to tube is impossible.

Using Eq. (1) as the standard, the following are developed for an isolated condenser; note well, this development applies to any shell and tube heat exchanger analyzed as a complete component. In general, the $-m\Delta g_{Tube}$ term is replaced with $[+\varepsilon_{Cond} \Sigma_{Shell}\, mg_k)]$ as this substitution eliminates $\varepsilon_{Cond}$ when developing $\Delta T_{Corr}$ of Eq. (11) or, generically, Eq (16A). In addition, it is understood that the expression "summation of exergy flows associated with the heat exchanger's $T_{Hot}$ side" means to use Eq. (2) if describing a shell-side $\Delta G_{HTX}$ given its side-side temperature is taken to be $T_{Hot}$ (e.g., a condenser's shell-side inlet is at saturation, its temperature $T_{CDS}$ is the highest seen by the condenser); typically, $T_{CDX}=T_{CDS}+\Delta T_{Corr}$. However, if the exchanger's $T_{Hot}$ is associated with a heat exchanger's tube-side (e.g., a fossil-fired Steam Generator's water-in-tube heat exchangers and its boiler's Drum), then nomenclature reverses: $-I_{Tube}\equiv\Delta G_{HTX}\Rightarrow\Sigma_{Tube}$ $mg_{kk}$; $I_{Shell}\Rightarrow\Sigma_{Shell}$ $mg_k/\varepsilon_{Cond}$; and, typically, the corrected $T_{Hot}$ is based on the Drum's saturation temperature.

$$I_{Shell} \equiv -\Delta G_{HTX} \equiv -\sum\nolimits_{Shell} mg_k = +\left[1 - T_{Ref}/T_{CDX}\right]Q_{REJ} \qquad (2)$$

$$I_{Tube} \equiv +\varepsilon_{Cond}\sum\nolimits_{Shell} mg_k = -\left[1 - T_{Ref}/T_{CDX}\right]\varepsilon_{Cond}Q_{REJ} \qquad (3)$$

These fundamentals lead to definitions of Exergetic Reversibilities associated with the individual shell and tube sides.

$$+Q_{REJ} = +I_{Shell} + R_{Shell} \qquad (4)$$

$$-Q_{REJ} = +I_{Tube} + R_{Tube} \qquad (5)$$

$$R_{Shell} = +\left[T_{Ref}/T_{CDX}\right]Q_{REJ} \qquad (6)$$

$$R_{Tube} = +\left[1 - \frac{T_{Ref}}{T_{CDX}}\right]\varepsilon_{Cond}Q_{REJ} - Q_{REJ} \qquad (7)$$

And, finally, summation of total irreversibilities and Exergetic Reversibilities for an isolated condenser:

$$I_{Cond} = I_{Shell} + I_{Tube} = +\left[1 - \frac{T_{Ref}}{T_{CDX}}\right](1 - \varepsilon_{Cond})Q_{REJ} \qquad (8)$$

$$R_{Cond} = \qquad (9A)$$

$$R_{Shell} + R_{Tube} = +\left[\frac{T_{Ref}}{T_{CDX}}\right]Q_{REJ} + \left[1 - \frac{T_{Ref}}{T_{CDX}}\right]\varepsilon_{Cond}Q_{REJ} - Q_{REJ}$$

$$= -\left[1 - \frac{T_{Ref}}{T_{CDX}}\right](1 - \varepsilon_{Cond})Q_{REJ} \qquad (9B)$$

The traditional Carnot Engine is made compliant with Eq. (1), and thus becomes the bases for the Exergetic Engine by correcting Carnot's generic $T_{HOT}$ with a $\Delta T_{Corr}$ as derived from Eq. (8) less Eq. (10). This derivation results in: $T_{CDX}=T_{CDS}+\Delta T_{Corr}+459.67$. Note that $Q_{HTX}$ is used to emphasize that, generically: $Q_{HTX}=\Sigma_{Shell}$ $(mh)_k$ in Eq. (11). Note that $Q_{REJ}$ is strictly defined as the system's condenser energy flow as interfaced with the local environment; i.e., for such a single-sided Exergetic Engine (e.g., a condenser): $Q_{HTX}=Q_{REQ}$, $\Delta G_{HTX}=\Sigma_{Shell}$ $(mg)_k$ and $\varepsilon_{Cond}=0.0$, resulting in $I_{Cond-Shell}$ and $R_{Cond-Shell}$ thus confirming Eq. (4).

$$I_{Cond} = \left[1 - \frac{T_{Ref}}{T_{CDX}}\right]Q_{HTX} - \varepsilon_{Cond}Q_{HTX} \qquad (10)$$

$$\Delta T_{Corr} \equiv \left[T_{Ref}Q_{HTX}/(Q_{HTX} + \Delta G_{HTX})\right] - (T_{CDS} + 459.67) \qquad (11)$$

Although Eq. (11) is universal, its $\Delta G_{HTX}$ is corrected for pressure drop effects, $\Delta g_{\Delta P-Corr}$, when appropriate, defined by Eq. (16B). Refer to Table 3 which teaches applications of Exergetic Engine's irreversibility computations applicable for use in any thermal engine.

In summary, achieving high accuracy when monitoring an isolated condenser (i.e., any heat exchanger which involves both shell and tube) means employing Eq. (12). Eq. (12) is appropriate for either on- or off-line monitoring. Eq. (12) assumes that tube-side conditions are typically highly uncertain and that the shell-side has no pressure drop (i.e., a constant saturated condition is found in the shell, $T_{CDS}$). Note that once $\Delta T_{Corr}$ is determined, Eq. (12) is not dependent on mass flow.

$$I_{Cond} = \left[1 - T_{Ref}/(T_{CDS} + \Delta T_{Corr} + 459.67)\right](1 - \varepsilon_{Cond})Q_{REJ} \qquad (12)$$

This development also applies to a simple convective and/or thermal radiative heat loss from the shell-side (or separately from the tube-side) of any heat exchanger which has an internal flow of fluid and exchanges heat with its environment; i.e., given changes in the fluid's shell-side thermodynamic state. An obvious example is the condenser when analyzed as part of a defined Turbine Cycle (the condenser's tube-side is outside the system). The same principles hold as presented, but using only the shell-side; i.e., FIG. 1B and use of a single Exergetic Engine. A statement of the shell-side irreversible loss, based on Eqs. (1) & (2) becomes:

$$I_{Cond-Shell} = \left[1 - T_{Ref}/(T_{CDS} + \Delta T_{Corr} + 459.67)\right]Q_{REJ} \qquad (13)$$

When analyzing the environmental loss from the shell-side of a heat exchanger (e.g., a nuclear Steam Generator with $Q_{SGN-Loss}$ from its outer flow annulus, thus $\Delta T_{SCY}\neq0.0$ and with pressure drop, $\Delta P_{SCY}$, the following correction is applied: $\Delta g_{\Delta P-Corr}\equiv[g_{STI}-g(P_{SCI}, h_{STI}, T_{Ref})]$; generically described by Eq. (16B). Note: $\Delta T_{SCY}=T_{SCI}-T_{STI}$; etc. The correction, $\Delta g_{\Delta P-Corr}$, eliminates pressure drop effects which must be treated separately. Of course, any $\Delta P$ is an irreversible loss, but cannot be allowed to mask Eq. (1) heat exchanger effects. Note that the inlet $T_{STI}$ is used as the base for correcting temperature; given $\Delta T_{Corr}$ is f($Q_{SGN-Loss}$) and means the outlet $T_{SCI}$ will, of course, vary with $Q_{SGN-Loss}$. Thus, it is convenient to correct a constant $T_{STI}$ (for most SGN, taken as $T_{FW}$) thus a variable $\Delta T_{Corr}$. $\mathcal{K}_{SG}$ is the fraction of energy flow delivered to the SG from its source (fossil combustion or nuclear power) whose vessel may have a heat loss to the local environment ($Q_{SG-Loss}$); the TC suffering a ($\mathcal{K}_{SG}-1$) reduction in delivered energy flow. For the nuclear SG given the presence of an outer flow annulus, where: $T_{Y-Inlet}=T_{STI}$:

$$\Delta G_{HTX-Corr} = m_{FW}(\Delta g_{SCY} + \Delta g_{\Delta P-Corr}) \qquad (14A)$$

$$Q_{SGN-Loss} \equiv \mathcal{K}_{SG}m_{RV}(\Xi\Delta g_{RCX} + \Delta h_{RVP}) \qquad (15A)$$

For the fossil-fired SG where for the water walls, $T_{Y-Inlet}=f(P_{Drum})$:

$$\Delta G_{HTX-Corr} = \sum\nolimits_{Tube} [m(g + \Delta g_{\Delta P-Corr})]_k \qquad (14B)$$

$$Q_{SGF-Loss} \equiv \mathcal{K}_{SG}m_{AF}(HHVP + HBC) \qquad (15B)$$

To Summarize, Generically, for Both Nuclear and Fossil:

$$\Delta T_{Corr} \equiv \left[T_{Ref} Q_{Y-Loss}/(Q_{Y-Loss} + \Delta G_{HTX-Corr})\right] - (459.67 + T_{Y-Inlet}) \quad (16A)$$

$$\Delta g_{\Delta P-Corr} \equiv \left[g_{Y-Inlet} - g(P_{Y-Outlet}, h_{Y-Inlet}, T_{Ref})\right] \quad (16B)$$

$$I_{Y-Loss} = \left[1 - T_{Ref}/(T_{Y-Inlet} + \Delta T_{Corr} + 459.67)\right] Q_{Y-Loss} \quad (17)$$

Figure 1B:
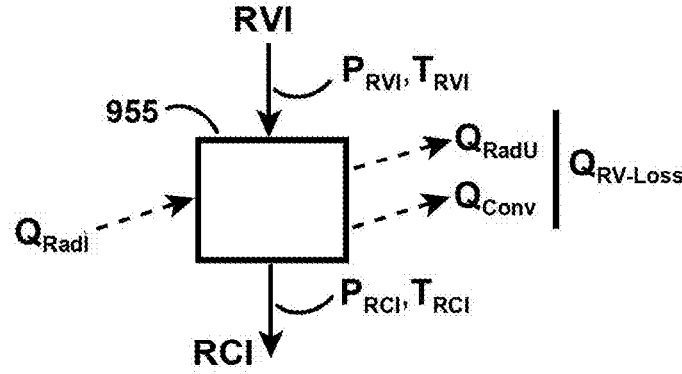
FIG. 1B is a representation of a single Exergetic Engine used to describe the irreversible effects of a heat exchanger's energy flow from its shell-side to its local environment; by example, its nomenclature describes a Reactor Vessel's heat loss before the coolant's core entrance.
Figure 1B:
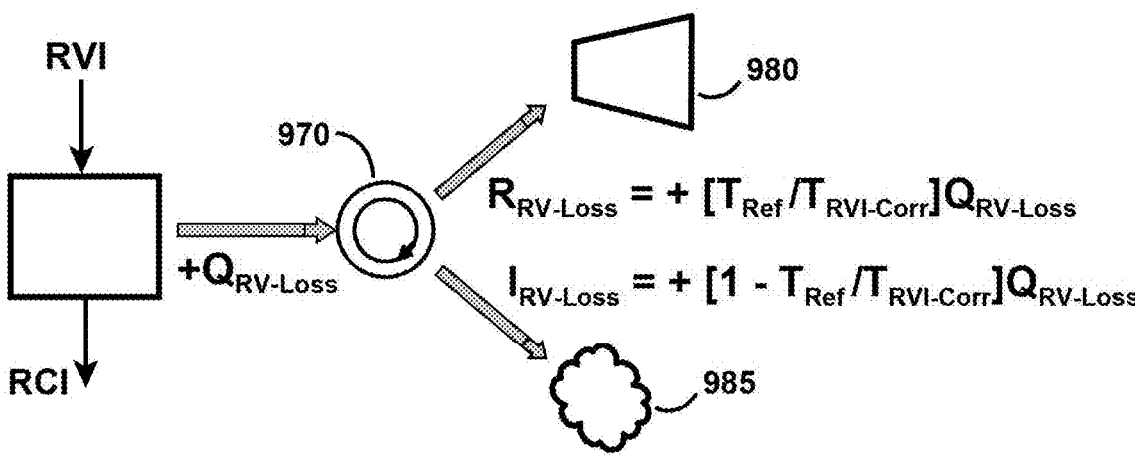

This same technique is applicable to the Reactor Vessel (RV) in which its $Q_{RV-Loss}$ consists of convection, thermal radiation and heating effects from nuclear radiation; used by example in FIG. 1B. Beta ($\beta$) and associated Bremsstrahlung radiation is spent between the peripheral fuel assemblies and the inner core shell. Gamma ($\gamma$) and $^1n_0$ heating of RV structures between the peripheral fuel assemblies and the outer RV vessel has import. Such heating can be computed using well-established art (e.g., S. Glasstone & A. Sesonske, *Nuclear Reactor Engineering*, D. Van Nostrand Co, NY, 1963; pp. 614-616). However, the recommended procedure is a combination of analytics and thermography to determine $Q_{RV-Loss}$. This will indicate whether the $\Delta$Exergy Flow associated with fission's mass defect effects, generated from peripheral fuel assemblies, will impact the computed average nuclear power, $m_{RV}\Delta g_{RCX}$. If analytics indicate minimal nuclear radiation effects, convection loss may still invoke a $Q_{RV-Loss} > 0.0$ as detected from thermography. In either case, if $Q_{RV-Loss} > 0.0$ and affects from $\Delta P_{RCY} > 0.0$ are applicable, then the following correction must apply: $\Delta g_{\Delta P-Corr} \equiv [g_{RVI} - g(P_{RCI}, h_{RVI}, T_{Ref})]$ with application of the nuclear Eqs. (14) thru (17) to the Reactor Vessel $$I_{RV-Loss} = \left[1 - T_{Ref}/(T_{RVI} + \Delta T_{Corr} + 459.67)\right] Q_{RV-Loss} \quad (18)$$

System Entropy Flow

Figure 2:
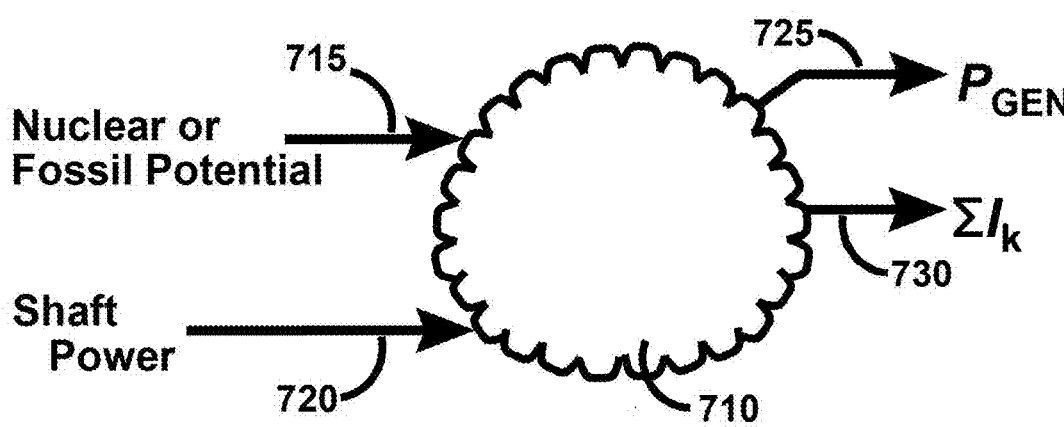
FIG. 2 is a representation of thermodynamic laws, as taught FIG. 2 aids visualization of a First Law less a Second Law expressions.
Figure 2:
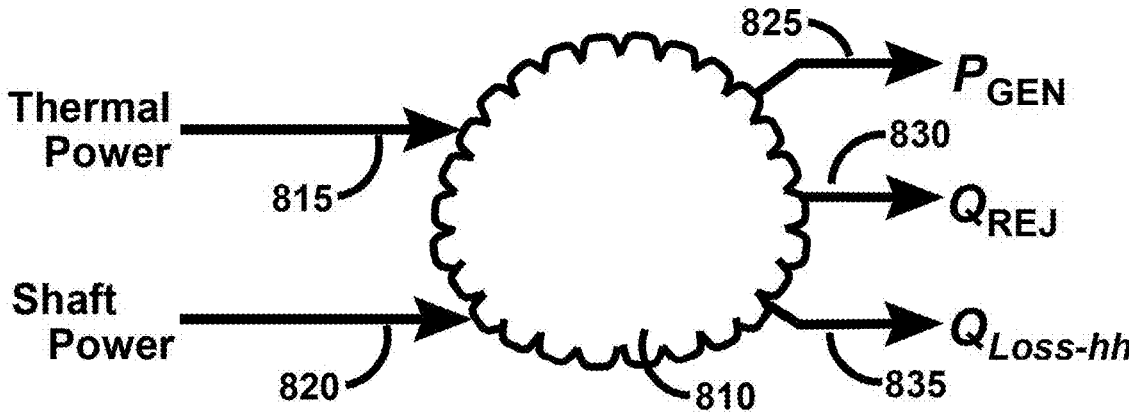

FIG. 2 is based on '822 FIG. 6. Its Second law representation is modified to indicate that $G_{IN}$ for both nuclear and fossil-fired power is formed from their thermodynamic potentials to make actual shaft power, plus shaft powers (e.g., pumps and fans shaft powers) entering the system. The objective of '822 was the evaluation different loss types, environmental energy flows versus irreversibilities. This disclosure's objective is to evaluate differences between the two laws of thermodynamics resulting in System Entropy Flows and reversibilities: First Law conversation of energy flows less Second Law exergy analysis. Initial results may appear similar to '822, but end usage differ considerably.

For the nuclear engine, '822 Eq. (1ST) less a corrected Eq. (2ND) is given as Eq. (19). Note that the first four Exergetic Reversibility terms on the right-side reflect the teachings herein (given $T_{Hot}$ and Carnot reversibilities are now corrected).

$$C_E V_{Fuel} \sum\nolimits_F \overline{v}_{REC} \Phi_{TH}(\Xi - 1) = \quad (19)$$

$$\left(T_{Ref}/T_{RVI-Corr}\right)Q_{RV-Loss} + \left(T_{Ref}/T_{STI-Corr}\right)Q_{SGN-Loss} +$$

$$\left(T_{Ref}/T_{TC-Corr}\right)Q_{TC-Loss} + \left(T_{Ref}/T_{CDS-Corr}\right)Q_{REJ} + \int d(\mathrm{mg})_{TC} +$$

$$\int d(\mathrm{mg})_{SGN} - (mT_{Ref}\Delta s)_{TUR-Aux} - \sum\nolimits_{Pump} (mT_{Ref}\Delta s)_{ii} -$$

$$\sum\nolimits_{TUR-HP}(mT_{Ref}\Delta s)_{ii} - \sum\nolimits_{TUR-LP}(mT_{Ref}\Delta s)_{ii}$$

The left-side of Eq. (19) is $f(\Phi_{TH}\Sigma_F\overline{v}_{REC}\Xi)$ via Eq. (1ST) the thermal power ($m_{RV}\Delta h_{RCX}$), less $f(\Phi_{TH}\Sigma_F\overline{v}_{REC})$ via Eq. (2ND) the nuclear power ($m_{RV}\Delta g_{RCX}$); thus reducing to a statement of the nuclear power plant's System Entropy Flow. The first term on the right-side is described by Eq. (18); the second term by Eq. (17); the third following Eq. (13) where $T_{TC-Corr}$ is defined by: $T_{TC-Corr}=T_{TC-Loss}+\Delta T_{Corr}$ where $T_{TC-Loss}$ is defined by Eq. (15) in '822. The fourth term on the right-side is the condenser's+$Q_{REJ}$ less Eq. (13), based on Eq. (11) given $Q_{REJ}=Q_{HTX}$, via $[Q_{REJ}-I_{Cond}=Q_{REJ}+R_{Cond}]$, both sides producing a $f[(T_{Ref}/T_{CDX})Q_{Loss}]$ term. Note that an un-capitalized "entropy flows" term is defined generically as all non-Exergetic Reversible terms found in Eqs. (19) or (22); a capitalized "Entropy Flow" is herein defined as a System Entropy Flow ($\dot{S}_{Nucl}$ or $\dot{S}_{Foss-SG}$), or as a Component Entropy Flow ($f[(mT_{Ref}\Delta s)_{ii}]$). Rearranging Eq. (19) a generic expression relating $\dot{S}_{Nucl}$ to the four nuclear Exergetic Reversibilities and the summation of Component Entropy Flows is obtained:

$$m_{RV} T_{Ref} \Delta s_{RCX} = C_E V_{Fuel} \sum\nolimits_F \overline{v}_{REC} \Phi_{TH}(\Xi - 1) \quad (20)$$

$$= + \sum\nolimits_{hh} f\left(T_{Ref}/T_{Y-Corr}\right) Q_{Y-Loss} - \sum\nolimits_{ii}(mT_{Ref}\Delta s)_{ii} \quad (21)$$

The fossil-fired power plant's First Law less Second Law produces the same terms found on the right-side of Eq. (19), less the $Q_{RV-Loss}$ term and plus an Intermediate Pressure Turbine term. As discussed in the BACKGROUND, for the fossil engine the left-side of an Eq. (19)-like expression is more complex given $G_{IN}$ is more complex. The following Eq. (22) is a First Law less Second Law description; note that input pump and fan powers less $\Sigma(m\Delta g)_{Pump+Fan}$ results in entropy flows, as is also the case for turbine stages.

$$\sum\nolimits_{SGF} (\dot{m}T_{Ref}\Delta s)_i = \left(T_{Ref}/T_{STI-Corr}\right) Q_{SGF-Loss} + \quad (22)$$

$$\left(T_{Ref}/T_{TC-Corr}\right) Q_{TC-Loss} + \left(T_{Ref}/T_{CDS-Corr}\right) Q_{REJ} +$$

$$\int d(\mathrm{mg})_{SGF} + \int d(\mathrm{mg})_{TC} - (mT_{Ref}\Delta s)_{TUR-Aux} -$$

$$\sum\nolimits_{Pump+Fan} (mT_{Ref}\Delta s)_k - \sum\nolimits_{TUR-HP} (mT_{Ref}\Delta s)_{ii} -$$

$$\sum\nolimits_{TUR-IP} (mT_{Ref}\Delta s)_{ii} - \sum\nolimits_{TUR-LP} (mT_{Ref}\Delta s)_{ii}$$

Eq. (22) can be reduced in similar fashion as done with the nuclear engine, resulting in Eq. (23). However, understand that the condenser's impact on the fossil engine is the objective, the fossil engine analytics are reduced by eliminating the combustion process, describing only the working fluid as the confining system. Thus, Eq. (22) is greatly simplified by only analyzing the result of combustion energy flow delivered to the Steam Generator's working fluid (tube-side). Such analysis includes: main steam routing, reheat, spray flows and soot blowing energy flows. A simulation of the fossil-fired Steam Generator is conveniently obtained by using Exergetic Systems® EX-FOSS simulator in combination with the EX-SITE computer simulator of Turbine Cycles (these software products are available from www.ExergeticSystems.com). First less Second Law descriptions, result in tube-side entropy flows found throughout the Steam Generator, and producing a fossil System Entropy Flow, $\Sigma_{SGF} (\dot{m}T_{Ref}\Delta s)_i$, which is $\dot{S}_{Foss-SG}$.

$$\sum\nolimits_{SGF} (\dot{m}T_{Ref}\Delta s)_i = +$$

$$\sum\nolimits_{hh} f(T_{Ref}/T_{Y-Corr})Q_{Y-Loss} - \sum\nolimits_{ii} (mT_{Ref}\Delta s)_{ii} \qquad (23)$$

It is obvious that the Exergetic Reversibility term of Eq. (23) defines the summation of SGF and TC Entropy Flows; thus the System Entropy Flow results from a few Exergetic Reversibility terms, less the summation of, typically, hundreds of Component Entropy Flows.

Allow generalized notation in which the left-side of Eq. (20) and the left-side of Eq. (23) are respectively termed $\dot{S}_{Nucl}$ and $\dot{S}_{Foss-SG}$, and herein defined as their "System Entropy Flow" for the nuclear and fossil-fired power plant. These are further generalized by the symbol $\dot{S}_{SYS}$ which is viewed as a generic System Entropy Flow. Dividing Eqs. (21) and (23) by $\dot{S}_{SYS}$ results:

$$1.0 = +\left[\sum\nolimits_{hh} f(T_{Ref}/T_{Y-Corr})Q_{Y-Loss}/\dot{S}_{SYS}\right] - \qquad (24A)$$

$$\left[\sum\nolimits_{ii} (mT_{Ref}\Delta s)_{ii}/\dot{S}_{SYS}\right]$$

Eq. (24) has advantage when describing a fossil engine given its simplicity in presenting a unique thermodynamic understanding. However, Eqs. (21) and (23) also can be presented by equating Exergetic Reversibilities to the summation of all Entropy Flows.

$$\sum\nolimits_{hh} f(T_{Ref}/T_{Y-Corr})Q_{Y-Loss} = \dot{S}_{SYS} + \sum\nolimits_{ii} (mT_{Ref}\Delta s)_{ii} \qquad (24B)$$

To twist the Second Law, Eq. (24B) states that Exergetic Reversibilities must be solely responsible for all Entropy Flow gains seen by the thermal engine. Or, to simplify, an analyst may add $\dot{S}_{SYS}$ and Component Entropy Flows, resulting principally in the condenser's Exergetic Reversibility. Eq. (24B) simply emphasizes proper treatment of the condenser and its use of the Exergetic Engine (i.e., $R_{Cond-Shell}$) for demonstrating an improved power plant thermodynamic understanding based on entropy flows.

Further, Eqs. (21) and (23) are important as they also suggest that instead of laborious computations of individual Component Entropy Flows—the Turbine Cycle containing hundreds of components, not all well understood-they can be used to independently solve $\Sigma_{ii}(mT_{Ref}\Delta s)_{ii}$ terms given the Exergetic Reversibilities consist of only the first four terms in Eq. (19), and three in Eq. (22).

$$\sum\nolimits_{ii} (mT_{Ref}\Delta s)_{ii} = +\sum\nolimits_{hh} f(T_{Ref}/T_{Y-Corr})Q_{Y-Loss} - \dot{S}_{SYS} \qquad (25)$$

Note, that for the nuclear engine, $Q_{REJ}$ and Reactor Vessel flow, $m_{RV}$, are computed based on NCV Methods. For the fossil engine, $Q_{REJ}$ and Feedwater flow, $m_{FW}$, are computed and/or verified based on Input/Loss Methods noting that EX-FOSS software and a TC simulator are important conveniences.

The worth of these techniques cannot be overstated. For 80 years, since Fermi (in 1937) and Keenan (in 1941) first developed the availability (exergy) concept, thermodynamics the world over taught that a fossil engine's heat rejection, thermodynamically, is "worth very little" (this inventor included). Indeed, condensing low pressure steam results in a FFCI$_{Cond}$ of 32.51 when considering the complete fossil system's total $G_{IN}$ (fuel, combustion air, working fluid, etc.), or 74.27 if just considering an isolated SG; see TABLE 2B.

The nuclear system FCI$_{Cond}$ is 155.27, see TABLE 1D; the nuclear condenser being at $\approx 5$ times more sensitive than the fossil-fired condenser. This, of course, versus a 60 to 70% energy flow loss via both systems' heat rejection. As Eqs. (21) & (23) numerically demonstrate that the attitude of traditional thermodynamics is wrong headed. Yes, the nuclear condenser's irreversibility is still small; but inherently, this also means its Exergetic Reversibility can be five to six times that of Component Entropy Flows; demonstrated below. Given Eq. (24)'s $\dot{S}_{SYS}$ is known with high accuracy for the nuclear system, this leads to understanding system losses which are reduced to the condenser's Exergetic Reversible term plus a few others (having minor import). Note, the NCV Method computes the four system parameters: $\Phi_{TH}$, $P_{GEN}$, $Q_{REJ}$ and $m_{RV}$, plus a computed nuclear Fixed $T_{Ref}$; thus, resolving system uncertainties means understanding condenser losses (with unusual precision), with minor RV and SG vessel losses and miscellaneous convective TC losses. The fossil system is less sensitive (justifying, in part, historic bias) but, as taught herein, focus must be had on its condenser Exergetic Reversibility for improved system understanding.

As Eqs. (21), (23) & (24A) suggest, Exergetic Reversible terms are equal to the sum of Entropy Flows, and numerically swamp the sum of Component Entropy Flows. Note that System Entropy Flows, especially $\dot{S}_{Nucl}$, can be determined with high accuracy. In summary, action to be taken for the nuclear engine includes: measure the core's entropy and enthalpy rises; use NCV to determine RV coolant flow, $Q_{REJ}$, etc.; analyze the system using Eqs. (20) & (21); thus resulting in the analyst having an improved understanding of his/her system. In summary, for the fossil engine (or any Steam Generator): determine the thermal load and an estimated $G_{IN}$ or preferably, use Steam Generator and Turbine Cycle simulators; determine FFCIs based on highly accurate Exergetic Reversibilities and analyze the system using Eq. (24); then use Input/Loss Methods to verify results using one or more of the four testing methodologies.

Verification of a Nuclear Engine's Entropy Flows

It is obvious that Eqs. (20) & (21) describe a nuclear engine's Entropy Flows and Exergetic Reversibilities. The nuclear core's increase in Entropy Flow is demonstrated to be $(\Xi-1)$ times nuclear power; where $\Xi$ is based on neutrino and total MeV release. $\Delta g_{RCX}$ is based on a Fixed $T_{Ref}$ determined using Eq. (10) of '822. This is a verification test on measured core inlet and outlet state properties and on the Fixed $T_{Ref}$ determined as based on an assumed burnup (MWD/MTU).

$$(\Xi - 1) = m_{RV}T_{Ref}\Delta s_{RCX}/(m_{RV}\Delta g_{RCX}) \qquad (26)$$

Obviously, the RV coolant flow terms either cancel, or can be used for trending a computed $m_{RV}(t)$ over time if exercising Eq. (30C). The term $[T_{Ref}\Delta s_{RCX}/\Delta g_{RCX}]$, and its equivalence $[m_{RV}T_{Ref}\Delta s_{RCX}/(m_{RV}\Delta g_{RCX})]$ which is the ratio of $\dot{S}_{Nucl}$ to nuclear power, is herein defined as the "ŚNucl Ratio".

To further extend the usefulness of Eq. (26), it is to be noted that $(\Xi-1)$ is unique for any given initial fissile loading. For example, for the common [235]U reactor, as the fission engine produces power, its [235]U loading is depleted while [239]Pu and [241]Pu are built up. Examination of '822 TABLE 3 indicates that for a virgin (un-irradiated) [235]U system, that $(\Xi_{U235}-1)=0.917144$. For the pure Pu isotopes: $(\Xi_{Pu239}-1)=0.934705$, and $(\Xi_{Pu241}-1)=0.920681$. Thus, if the fission engine is initially loaded with [235]U, the $(\Xi-1)$ quantity as based on measured thermodynamic properties across the nuclear core, can never be less than that associated with [235]U. This statement must be modified given the fission of $^{238}$U, but typically it has a second order affect given its depletion creates Pu. Therefore, for verification of a reactor vessel fluid measurements, confirmation of the reactor's burnup (MWD/MTU), and most importantly verification of Eq. (21)'s Exergetic Reversibilities and Entropy Flows, the following is governing for a $^{235}$U system:

$$\left[T_{Ref}\Delta s_{RCX}(t)/\Delta g_{RCX}(t)\right]_{U235} \geq (\Xi_{U235}-1) \tag{27A}$$

$$\geq 0.917144 \tag{27B}$$

Application of the concept underlying Eq. (26) also has obvious flexibility as it can be applied to other fission systems. For example, a Thorium ($^{232}$Th) reactor will breed fissile $^{233}$U, whose $(\Xi_{U233}-1)=0.932374$. Given an initial seeding of highly enriched $^{235}$U, with minimum $^{238}$U, the lower $(\Xi_{U235}-1)$ value will then off-set an even slight Pu production; the following verification of core thermal properties associated with a Thorium reactor is then governed by:

$$\left[T_{Ref}\Delta s_{RCX}(t)/\Delta g_{RCX}(t)\right]_{U233} \leq (\Xi_{U233}-1) \tag{28A}$$

$$\leq 0.932374 \tag{28B}$$

If a Thorium reactor employs moderately enriched $^{235}$U then $(\Xi-1)$ must be weighted. For a molten salt Thorium reactor, using continuous re-fueling, Eq. (28) must be modified with mass flows bearing fissile material which address core retention times.

Further, for a fast reactor breeding $^{238}$U in which its average neutron flux is developed from a mixture of thermal $^{235}$U and some fast $^{238}$U fissions, then the following average $\Xi$ would apply; note that: $\Xi_{U238}=1.900587$.

$$\Xi(t) = \left[\Xi_{U235}\int_{0.02\,eV}^{040\,eV}\left(V_{Fuel}\sum\nolimits_{F}\bar{v}_{REC}\right)_{U235}d\Phi_{TH}(t) + \right. \tag{29A}$$

$$\left.\Xi_{U238}\int_{1\,MeV}^{20\,MeV}\left(V_{Fuel}\sum\nolimits_{F}\bar{v}_{REC}\right)_{U238}d\Phi_{TH}(t)\right]/\left[m_{RV}\Delta g_{RCX}(t)/C_{E}\right]$$

$$\left[T_{Ref}\Delta s_{RCX}(t)/\Delta g_{RCX}(t)\right]_{Breeder} \geq \left[\Xi(t)-1\right] \tag{29B}$$

Because the NCV's Core Thermal Power is neutronically dependent, as demonstrated in the above limit tests, a limiting range can also be created for Core Thermal Power, CTP ($=m_{RV}\Delta h_{RCX}=m_{RV}\Delta g_{RCX}\Xi$) and/or its $\Delta h_{RCX}$. Assume a conventional $^{235}$U initial fueling, as Pu is created the Inertial Conversion Factor will increase in value, described by:

$$\Xi_{U-Pu}(t) \equiv \frac{\Phi_{TH}(t)\left[\left(\Xi\,V_{Fuel}\sum\nolimits_{F}\bar{v}_{REC}\right)_{U235} + \left(\Xi\,V_{Fuel}\sum\nolimits_{F}\bar{v}_{REC}\right)_{Pu239}+\left(\Xi\,V_{Fuel}\sum\nolimits_{F}\bar{v}_{REC}\right)_{Pu241}\right]}{\left[m_{RV-NCV}(t)\Delta g_{RCX}(t)/C_{E}\right]} \tag{30A}$$

This leads to operational limits applied for range testing CTP and/or core fluid extensive (state) properties, the operational limits of Eqs. (30B) & (30C) based on E and core $\Delta$Exergy (or core exergy flow, $\dot{m}\Delta g$):

$$m_{RV-NCV}(t)\Delta g_{RCX}(t)\Xi_{U-Pu}(t) \geq \left[m_{RV-NCV}(t)\Delta h_{RCX}(t)\right] \geq \tag{30B}$$

$$m_{RV-NCV}(0)\Delta g_{RCX}(0)\Xi_{U235}$$

Use of Eq. (30C) Addresses Changes in an Indicated RV Coolant Flow:

$$C_{RV-Corr}\Delta g_{RCX}(t)\Xi_{U-Pu}(t) \geq C_{RV-Corr}\Delta h_{RCX}(t) \geq \Delta g_{RCX}(0)\Xi_{U235} \tag{30C}$$

In these equations: the current burnup is taken at time "t" versus at startup (t=0.0); $m_{RV-NCV}$ is an accurately computed RV coolant flow (e.g., using the NCV Method); and where $C_{RV-Corr}\equiv m_{RV}(t)/m_{RV}(0)$, addresses indicated RV flows. For example, assume a 33% production of nuclear power from Pu at 40,000 MWD/MTU burnup, then Eq. (30)'s limits are ranged from 1.922173 [the $\mu_{U-Pu}(t)$ value via Eq. (30A)] to the $\Xi_{U235}$ value at startup of 1.917144. The average of this range implies a tolerance on CTP & $\Delta h_{RCX}$ of ±0.13%, solely based on $\bar{\Xi}_{U-Pu}(t)$, $\Xi_{U235}$ and measured fluid state data; this is more than an order of magnitude improvement over the currently accepted uncertainty of ±2.0% in Core Thermal Power; see '822, Col. 2, Lines 54-65.

The above verifications of reactor core thermal properties, as shown by Eqs. (27)-(30), based on Eq. (26), are herein defined as "verification of the reactor core's set of thermodynamic extensive properties and a Fixed $T_{Ref}$(and/or coolant flow) and a temporal Inertial Conversion Factor." This definition includes the obvious replacement of $[T_{Ref}\Delta s_{RCX}/\Delta g_{RCX}]$ with function of $[\Delta h_{RCX}/\Delta g_{RCX}]$ as taught via Eq. (9) in '822, thus comparing directly to $\Xi$ or $\bar{\Xi}$.

TABLES 1A, 1B and 1C presents computed data associated with a condenser and a Steam Generator servicing a 1270 MWe PWR. TABLE 1A is associated with TABLE 1D. TABLES 1B and 1C demonstrate Eqs. (20) & (21) based on an independent model used for sensitivity study. What is critically important to this disclosure is the realization that balance of Exergetic Reversibilities and Entropy Flows, detailed in Eq. (19), etc., intrinsically reduces uncertainty in understanding a nuclear power plant by establishing inequalities about a computed Core Thermal Power.

TABLE 1A

| Exergetic Engine Data for a 1270 MWe PWR System and Condenser | |
|---|---|
| $G_{IN}$ | 68.55817 × 10$^8$ Btu/hr |
| $m_{RV}\Delta g_{RCX}$ | 64.81341 × 10$^8$ Btu/hr |
| Inertial Conversion Factor, $\Xi$ | 1.917144 |
| $\varepsilon_{Cond}$ | 35.22791% |
| $T_{CDS}$ | 120.51774° F. |
| $\Delta T_{Corr}$ | 0.748967° $\Delta$F. |
| $Q_{REJ}$ | 81.14990 × 10$^8$ Btu/hr |
| $I_{Cond-Shell}$, Eqs. (2) & (13) | 10.64529 × 10$^8$ Btu/hr |

In TABLE 1C it is observed that a 1% difference in SG vessel's $Q_{SGN-Loss}$, creates a 1.6% error in the Core Entropy Flow. Note that $\dot{S}_{Nucl}$ is fixed by neutronics and core fluid properties; given its determination, errors made in the core and/or Component Entropy Flows are intrinsically limited. Exergetic Reversibilities must equal the summation of Entropy Flows ($\dot{S}_{Nucl}$ and components)! An error in the four nuclear Exergetic Reversibility terms (RV, SG, miscellaneous TC losses, and condenser heat rejection) has a six-fold effect on Component Entropy Flows; given errors, individual component values can be driven negative!

TABLE 1B

Base Data for a 1270 MWe PWR Steam Generator

| | |
|---|---|
| $\Xi\ m_{RV}\Delta g_{RCX}$ | $124.25663 \times 10^8$ Btu/hr |
| $m_{RV}\Delta h_{RVP}$ | $0.84550 \times 10^8$ Btu/hr |
| $\dot{S}_{Nucl} = m_{RV}T_{Ref}\Delta s_{RCX}$ | $59.44323 \times 10^8$ Btu/hr |
| $\Delta g_{\Delta P\text{-}Corr}$ | $-0.60046$ $\Delta°$ F. |
| $T_{STI}$ | $446.3602°$ F. |
| $T_{SCI}$ ($\mathbb{K}_{SG} = 1.967\%$) | $432.7409°$ F. |

TABLE 1C

**Exergetic Engine Sensitivity Data
for a 1270 MWe PWR Steam Generator**

| $\mathbb{K}_{SG}$ (%) | $Q_{SGN\text{-}Loss}$ Eq. (15) ($\times 10^8$ Btu/hr) | $\Delta T_{Corr}$ (° F.) | $I_{SGN\text{-}Loss}$ ($\times 10^8$ Btu/hr) | $\dot{S}_{Nucl}$ Error (%) |
|---|---|---|---|---|
| 1.0000 | 1.251021 | −3.3283 | 0.551536 | +1.54398 |
| 1.9670 | 2.460759 | −6.7389 | 1.079653 | +0.04875 |
| 2.0000 | 2.502043 | −6.8557 | 1.097584 | −0.05305 |
| 3.0000 | 3.753064 | −10.4056 | 1.638025 | −1.67086 |

TABLE 1D presents a balance of Exergetic Reversibilities and Entropy Flows for a 1270 MWe nuclear engine using the methods disclosed. In TABLE 1D, italicized numbers are ratios of Exergetic Reversibilities or Entropy Flows to nuclear power ($m_{RV}\Delta g_{RCX}$); used for the nuclear engine given that: $T_{Ref}\Delta s_{RCX}/\Delta g_{RCX}=(\Xi-1)$.

TABLE 1D

Entropy Analysis of a 1270 MWe PWR System

| Component | Eq. (27) Calcs ($\times 10^8$, Btu/hr) | Eq. (26) Calcs ($\times 10^8$, Btu/hr) |
|---|---|---|
| Exergetic Reversibility Terms: [a] | | |
| Reactor Vessel Convection | 0.0000000 | |
| Steam Generator Vessel Convection | 0.0000000 | |
| Miscellaneous Turbine Cycle [b] | 0.2919223 | |
| Condenser's Exergetic Engine: $Q_{REJ}$ less $I_{Cond\text{-}Shell}$ [c] | 70.5046148 | |
| SUB-TOTAL[Exergetic Reversibility/($m_{RV}\Delta g_{RCX}$)] [d] | +70.7965371 | [+1.092313] |
| Entropy Flow Terms: | | |
| System Entropy Flow, $\dot{S}_{Nucl} = m_{RV}T_{Ref}\Delta s_{RCX}$ | 59.4432300 | |
| Reactor Plenum $\Delta$P Losses | −0.1143015 | |
| RV Pump | −0.0764024 | |
| System Piping $\Delta$P Losses | −1.5002901 | |
| Steam Generator Vessel Internals | −3.5269441 | |
| Main HP & LP Turbines [e] | −4.6218669 | −[+70.7965371 |
| MSR Internals | −0.4775863 | −59.4432300] |
| Auxiliary Turbine | −0.1621345 | |
| TC Feedwater Pumps | −0.0242473 | |
| TC Condensate Pumps | −0.0165848 | |
| Feedwater Heaters [f] | −0.8619261 | |
| Error in Components [g] | +0.0289769 | |
| SUB-TOTAL [Comp. Entropy Flows/($m_{RV}\Delta g_{RCX}$)] | −11.3533071 | [−0.175169] |
| SUMMATION [$T_{Ref}\Delta s_{RCX}/\Delta g_{RCX} = \Xi - 1$] | +59.4432300 | [+0.917144] |

Notes:
[a] Exergetic Reversibilities f[($T_{Ref}/T_{Y\text{-}Corr}$)$Q_{Y\text{-}Loss}$], associated with RV and SG vessel losses were assumed zero.
[b] Includes only linkage loss between the auxiliary turbine and FW pump.
[c] Based on $Q_{REJ}$ and $I_{Cond\text{-}Shell}$ values found in TABLE 1A, i.e., $R_{Cond\text{-}Shell}$.
[d] Nuclear power ($m_{RV}\Delta g_{RCX}$) used for ratios is found in TABLE 1A, as is $G_{IN}$.
[e] Last turbine stage's exhaust loss was taken to the UEEP as: $m_{L-0}\Delta g_{L-0}$.
[f] A 0.8% Feedwater heater vessel loss was assumed.
[g] Error relative to ($m_{RV}\Delta g_{RCX}$) was 0.049%. As argued, serious sensitivity exists; for example, a 10% error in the pressure drops decrease Entropy Flows by 1.58%.

To emphasize the sensitivity of reversibilities to a thermodynamic understanding of any thermal engine, and especially the nuclear engine's condenser, consider the difference between the Exergetic Engine versus the classic Carnot Engine by setting $\Delta T_{Corr}$=0.0. This results in a 0.127% change in the nuclear $R_{Cond\text{-}Shell}$, an initial value being $7.0505\times10^8$ Btu/hr. For the nuclear engine, numerically the four Exergetic Reversible gains are factor of six greater than the total of Component Entropy Flows. If $\Delta R_{Cond\text{-}Shell}$ is treated as an increase in Component Entropy Flows—in fact the operator, without analyzing Fission Consumption Indices, would be incapable of identifying the degradation—the percentage impact on Component Entropy Flows is potentially 0.722%. Again, this is a six-fold increase in sensitivity; and thus, affects the basic understanding of a nuclear engine. Such sensitivity is not seen in fossil engines. In summary, slight changes in the condenser's Exergetic Reversibilities, or slight changes in the monitored $FCI_{Cond\text{-}Shell}$, means an immediate review of all Fission Consumption Indices would be prudent . . . leading to identification of degradations so that corrective actions can be instigated.

Note that TABLE 1D mirrors Eq. (21) in evaluating relative Exergetic Reversible gains and Entropy Flow losses. This takes advantage of the uniqueness of the nuclear engine given that:

$$\left[T_{Ref}\Delta s_{RCX}/\Delta g_{RCX}\right] = (\Xi - 1);$$

which is a known constant for a given burnup. If an erroneous $\Delta R_{Cond-Shell}$ (given $\Delta T_{Corr}=0.0$) is applied to a back-calculated ($\Xi-1$), it would vary from 0.917144 to 0.918054, which is equivalent to a burn-up of approximately 6,000 MWD/MTU; a very serious error.

Verification of a Fossil Engine's Entropy Flows

For the fossil-fired engine, Eq. (22)'s $\dot{S}_{Foss-SG}$ comprises fluid states and flows associated with $\Sigma_{SGF}(mT_{Ref}\Delta s)_i$, which describes the main steam exchanger, Reheat, sprays, soot blowing, etc. The related term $\Sigma_{SGF}(\dot{m}h)_i$ is the nominator in a statement of the fossil system's thermal efficiency (the SG's output as used to define boiler efficiency, $\eta_B$). '429 teaches such an efficiency (i.e., the EX-FOSS program), but based on molar terms without dependency on any mass flow. '429 also teaches the calculation of the fuel's heating value (HHPV), $g_{Fuel}$, etc. based on effluents. This allows the following confirmation of the total thermal load produced from the Steam Generator. Again, for all fossil engines the fuel's reference is $T_{CAL}$ as based on either the analyst's choice when computing gaseous fuel Heats of Combustion, or on the laboratory technician's chosen calorimetric bath temperature. If $T_{CAL}$ is not employed, the analyst is a fool. For the fossil condenser, using a Floated $T_{Ref}$ is common place.

$$\dot{S}_{Foss-SG} \equiv \sum\nolimits_{SGF} (\dot{m}T_{Ref}\Delta s)_i = \eta_B[m_{AF}(HHVP+HBC)] - \sum\nolimits_{SGF} (\dot{m}g)_{ii} \quad (31)$$

For a fossil-fired SG complexity abounds; and even if its working fluid is considered in isolation (i.e., Second Law analysis of the combustion process is not considered here, however it is taught as part of the Input/Loss Method as referenced). Development of $\Delta T_{Corr}$ for the working fluid side of the fossil Stean Generator (SGF) is a multi-step process: first determine the SG's thermal load ($Q_{Load}$); its Boiler Drum pressure ($P_{Drum}$) thus its saturation ($T_{Drum}$); and then determine ($m\Delta g)_k$ quantities for the working fluid as it traverses thru SGF heat exchangers. In summary, if SGF heat exchangers are analyzed individually then: the water wall inlet to the Drum's $T_{Drum}$ would employ Eqs. (33) & (34); the balance of routine heat exchangers must be corrected for both $\Delta g_{\Delta P-Corr}$ and $\Delta T_{Corr}$. As taught: $T_{Drum-Corr}=T_{Drum}+\Delta T_{Corr}+459.67$.

$$I_{SGF-Tube} = Q_{Load} - [T_{Ref}/T_{Drum-Corr}]Q_{Load} \quad (32A)$$

$$= -\sum\nolimits_{WF} (mg)_k \quad (32B)$$

$$\Delta T_{Corr} = \left\{ T_{Ref}Q_{Load}/\left[ Q_{Load} + \sum\nolimits_{WF} (mg)_k \right] \right\} - (459.67 + T_{Drum}) \quad (33)$$

$$I_{SGF-Tube} = [1 - T_{Ref}/(T_{Drum} + \Delta T_{Corr} + 459.67)]Q_{Load} \quad (34)$$

Eqs. (32A), (32B) & (34) produce identical results for the SGF's tube-side model. The typical fossil SG employed in power plants employs high complexity in heat exchanger arrangements and routings of the working fluid. The easiest method of generating $\Sigma_{WF} (m\Delta g)_k$ is to use the EX-FOSS SG simulator; for example, convective losses are assigned uniquely to each heat exchanger. Note that water walls have ambient exposure; however, internal exchangers (e.g., the Economizers and Reheater) have no such exposure. $\Delta T_{Corr}$ is typically between −40 to −50° $\Delta F$ for the Drum.

TABLE 2A presents numerical results associated with an Exergetic Engine applied to a Steam Generator associated with a fossil-fired power plant.

TABLE 2A

| Data for a 600 MWe Coal-Fired Condenser | |
| --- | --- |
| $\dot{S}_{Foss-SG} = \Sigma_{SGF} (\dot{m}T_{Ref}\Delta s)_i$ | $22.032415 \times 10^8$ Btu/hr |
| $\Sigma_{Shell} (mg)_k$ | $-1.926710 \times 10^8$ Btu/hr |
| $T_{Ref} = T_{TI}$ | $71.662600°$ F. |
| $T_{CDS}$ | $112.220523°$ F. |
| $\Delta T_{Corr}$ | $1.152304°$ $\Delta F$. |
| $Q_{REJ}$ | $26.470438 \times 10^8$ Btu/hr |
| $I_{Cond-Shell}$, Eqs. (1), (8) & (10) | $1.926710 \times 10^8$ Btu/hr |

TABLE 2B presents a numerical example of Exergetic Engine equations for a fossil engine, a 600 MWe coal-fired power plant using the Input/Loss Method. In TABLE 2B, italicized numbers are ratios relative to the computed System Entropy Flow, $\dot{S}_{Foss-SG}$, or $\Sigma_{SGF}(\dot{m}T_{Ref}\Delta s)_i$.

TABLE 2B

| Entropy Flow Analysis of a 600 MWe Coal-Fired Steam Generator | | |
| --- | --- | --- |
| Component | Eq. (25) Calcs ($\times 10^8$, Btu/hr) | Eq. (23) Calcs ($\times 10^8$, Btu/hr) |
| Exergetic Reversibility Terms: | | |
| Miscellaneous Turbine Cycle [a] | 0.0968567 | |
| Steam Generator Convection & Radiation Vessel Loss | 0.4005466 | |
| Condenser's Exergetic Engine: $Q_{REJ}$ less Eq. (13) [c] | 24.5437286 | |
| SUB-TOTAL (Exergetic Reversibilities/$\dot{S}_{Foss-SG}$) | +25.0411319 | (+1.136559) |
| Entropy Flow Terms: [d] | | |
| SG System Entropy Flow, $\dot{S}_{Foss-SG} \equiv \Sigma_{SGF} (\dot{m}T_{Ref}\Delta s)_i$ [e] | 22.0324145 | |
| System Piping $\Delta P$ Losses | −0.3277775 | |
| Main HP & LP Turbines [f] | −1.9039320 | |
| Auxiliary Turbine [g] | −0.1808421 | |
| TC Feedwater Pumps, via Aux. Turbine | −0.0701812 | −[+25.0411319 |
| TC Condensate Pumps, Motor | −0.0113891 | −22.0324145] |
| Feedwater Heaters | −0.5084663 | |

TABLE 2B-continued

| | | |
|---|---|---|
| Entropy Flow Analysis of a 600 MWe Coal-Fired Steam Generator | | |
| Component | Eq. (25) Calcs (×10⁸, Btu/hr) | Eq. (23) Calcs (×10⁸, Btu/hr) |
| Error in Components (0.028% of $\dot{S}_{SG}$) | −0.0061292 | |
| SUB-TOTAL (Component Entropy Flows/$\dot{S}_{Foss-SG}$) | −3.0087174 | (−0.136559) |
| SUMMATION (Exergetic − Com. Entropy Flows/$\dot{S}_{Foss-SG}$) [h] | +22.0324145 | (+1.000000) |

Notes:
[a] Assumed a 0.5% loss from all Feedwater heater vessels.
[b] EX-FOSS analysis assumed an ASME PTC 4 $L_\beta$ loss at 1.50%.
[c] Based on $Q_{REJ}$ and $I_{Cond}$ values, see TABLE 2A.
[d] Based on EX-FOSS (SG) and EX-SITE (TC) simulations of a 2005 System Effects Test, which produced: $G_{IN}$ for the system of 59.27 × 10⁸ Btu/hr, thus a $FFCI_{Cond}$ of 32.51 [$G_{IN}$ for the isolated SG was 25.94 × 10⁸ Btu/hr with a $FFCI_{Cond}$ of 74.28]; the sum of $FFCI_{Comb}$, $FFCI_{Air}$ & $FFCI_{Misc}$ totaled 562.34 (a huge ineffective waste).
[e] An EX-FOSS Steam Generator analysis produced: individual Component Entropy Flows summing to 22.0324145 × 10⁸ Btu/hr; the same value as $Q_{Load}$ less $\Sigma_{SGF}$ (mg)$_i$ for 8 SG heat exchangers plus soot blowing and Drum latent heat.
[f] Last turbine stage's exhaust loss was taken as: $m_{L-0}\Delta g_{L-0}$.
[g] The Auxiliary Turbine drives three pump stages: the main FW pump, heat exchanger spray pumps and the DA drain pump.
[h] The summation mirrors Eq. (24B).

To summarize, as explained, if the fossil-fired calorimetric temperature ($T_{CAL}$) is not used as a thermodynamic basis for all reactants (combustion air, soot blowing, sorbent injection, etc.), then one is guaranteed to violate the First Law. Although $T_{CAL}$ only applies to energy flows supplied to the system, if not properly used all Second Law analyses which are based on First Law solutions are bogus. For the nuclear engine, if the nuclear reference $T_{Ref}$(a Fixed $T_{Ref}$), as defined by Eqs. (9) & (10) in '822, is not used, then violation of both laws is guaranteed. For all nuclear and fossil engines, including an isolated Turbine Cycle, use of the Exergetic Engine is mandated. Second Law exergy analysis requires a defined $T_{Ref}$. The nuclear employs the Fixed $T_{Ref}$. The fossil $T_{Ref}$ may be determined using several methods:

$T_{Ref}$ may be chosen as the Condenser's tube-side inlet temperature (the assumed coldest reservoir seen by the fossil engine), thus a Floated $T_{Ref}$; a minor error will result.

For an isolated Turbine Cycle, the preferred embodiment is to determine $T_{Ref}$ based on an assumption that the condenser's thermal activity ceases. This means all inlet flows to the shell-side are returned to their saturated liquid state at their supplied pressures, and mixed with tube-side inlet conditions. The base concept determines an equilibrium temperature after all streams flow into the same "bucket". This will produce the correct temperature.

$$T_{Ref} = f\left(P_{Cond}, \overline{h}_{Equil}\right); \text{where: } \overline{h}_{Equil} = \qquad (35)$$

$$\left[\sum_{Shell} (mh_f)_k + (mh)_{TI}\right]/\left[\sum_{Shell} m_k + m_{TI}\right]$$

For the complete fossil-fired system, the preferred embodiment is to determine $T_{Ref}$ based on an assumption that all functional components in the system have cease, having come to an equilibrium state. Fuel firing is eliminated. This means to use an Eq. (35)-like equation but including [all non-fuel reactant] mass flows, corrected to $T_{CAL}$, including the condenser's tube-side inlet energy flow. Such mixing involves combustion air, Air Pre-Heater leakage, in-leakage of water, condenser tube-side state and flow, etc. Again, the resultant $\overline{h}_{Equil}$ will produce a temperature close to $T_{TI}$ but without error.

To emphasize the sensitivity of reversibilities to a thermodynamic understanding of a fossil-fired Turbine Cycle, again using the coal-fired unit for example, set: $\Delta T_{Corr}$=0.0. This results in a 0.079% change in $R_{Cond-Shell}$, a $\Delta R_{Cond-Shell}$ of 5.895×10⁶ Btu/hr. Numerically, the three Exergetic Reversible gains (TABLE 2B) are factor of 5 greater than the total of Component Entropy Flow losses. If $\Delta R_{Cond-Shell}$ is treated as an increase in these Entropy Flows—in fact the operator, without analyzing Fossil Fuel Consumption Indices, would not be able to identify the degradation—the percentage impact on Component Entropy Flows is potentially 0.40%. Thus, a 0.08% thermodynamic change in the fossil condenser, could well have a factor of 5 impact on base understanding of a fossil engine. Slight changes in the condenser's Exergetic Reversibilities, or changes in the $FFCI_{Cond-Shell}$ means immediate review of all Fossil Fuel Consumption Indices, thus identification of degradations such that corrective actions are instigated.

INDUSTRIAL APPLICABILITY

The above DETAILED DESCRIPTION describes how one skilled can embody its teachings when creating viable power plant analyses. This section describes its industrial applicability. That is, how to enable the Exergetic Engine and process system thermal evaluations based on Exergetic Reversibilities and Entropy Flows associated with a thermal engine: how to configure its computer (termed the "Calculational Engine"); how to process plant data; how to configure its equations for pre-commissioning and, separately, for routine operations; and, most importantly, presents specific recommendations as to what the plant operator needs to monitor (i.e., to absorb NCV or Input/Loss output information and to act upon that information). In summary the Calculational Engine, as a computer, processes a set of computer instructions, processes input data (e.g., operating parameters, Regulatory Limits, etc.), and processes output data. Such enablement is presented in four sections: The Exergetic Engine, System Entropy Flow and two verification sections. Details of the Calculational Engine and its data processing is discussed in '822.

The applicability of this disclosure includes processing Second Law irreversibilities associated with any component found in a nuclear or fossil thermal engine. Said components comprise: shell and tube heat exchangers with heat loss to the local environment; shell or tube heat exchangers with heat loss to the local environment; pumps and turbines with heat loss; and lengths of pipes with pressure drop and/or with a heat loss or gain. Note that: $\Delta T_{Corr}$ and $\Delta g_{\Delta P-Corr}$ are defined by Eqs. (16A) & (16B); "Floated" and "Fixed" refer to $T_{Ref}$ as defined; and $Q_{Loss}$ refers to heat loss to the local environment.

sis" and like expressions mean the same; that is, an application of the Second Law of thermodynamic principles descriptive of an exergy analysis. Exergy analysis describes the destruction of a total exergy flow supplied to a thermal engine ($G_{IN}$), as well as its concomitant creation of useful power output ($P_{GEN}$) and the summation of irreversible losses ($\Sigma I_n$) associated with the thermal engine.

TABLE 3

Uses of the Exergetic Engine and Associated Irreversibilities

| Heat Exchanger Type | Ref. Temp. | Define $T_{Hot}$ | $\Delta T_{Cor}$ | $\Delta g_{\Delta P}$ | $Q_{Loss}$ | Irreversibility |
|---|---|---|---|---|---|---|
| Fossil shell & tube, non-Condensing with heat loss. | Floated | Shell Inlet | Yes | Yes | $\Sigma_{Shell}\dot{m}\Delta h = Q_{HTX}$ | Eq. (1) or (8) based on Eqs. (16A) & (16B). |
| Nuclear shell & tube, non-condensing with heat loss. | Fixed | Shell Inlet | Yes | Yes | $\Sigma_{Shell}\dot{m}\Delta h = Q_{Y-Loss}$ | Eq. (1) or (8) based on Eqs. (16A) & (16B). |
| Fossil SG tube-side energy flow to the TC. | Floated | Drum Saturation | Yes | No | $\Sigma_{Tube}\dot{m}\Delta h = Q_{Load}$ | See discussion with $\Delta g_{\Delta P-Corr}$ & $\Delta T_{Corr}$. |
| Nuclear SG heat loss from outer flow annulus. | Fixed | PWR's $T_{STI}$ | Yes | Yes | $\dot{m}\Delta h_{RCY} = Q_{SGN-Loss}$ | Eq. (17) based on nuclear Eqs. (14)-(16) |
| Reactor Vessel heat loss from outer flow annulus. | Fixed | $T_{RVI}$ | Yes | Yes | $\dot{m}\Delta h_{RCY} = Q_{RV-Loss}$ | Eq. (18) based on nuclear Eqs. (14)-(16) |
| TC condenser, shell-side heat rejection (generic). | Floated or Fixed | Shell Saturation | Yes | No | $\Sigma_{Shell}\dot{m}\Delta h = Q_{REJ}$ | Eq. (2) based on Eq. (11). |
| Feedwater Heater with shell-side heat loss. | Floated or Fixed | Shell Saturation | Yes | No | $\Sigma_{Shell}\dot{m}\Delta h = Q_{HTX}$ | Eq. (1) or (8) based on Eq. (11). |
| Length of Pipe with $\Delta P$, and heat loss or gain. | Floated or Fixed | $T_{Inlet}$ | Yes | Yes | $\pm\dot{m}\Delta h = \pm Q_{HTX}$ | Follows Eq. (17), corrected via Eq. (16). |
| Pump with or without casing heat loss. | Floated or Fixed | $T_{Suction}$ | No | No | $\dot{m}\Delta h = P_{Shaft}$ | $P_{Shaft} - \dot{m}\Delta g = \dot{m}T_{Ref}\Delta s$; See Eq. (22). |
| Turbine with or without casing heat loss. | Floated or Fixed | $T_{Bowl}$ | No | No | $\dot{m}\Delta h = P_{Shaft}$ | $\dot{m}\Delta g - P_{Shaft} = \dot{m}T_{Ref}\Delta s$; See Eq. (22). |

Clarity of Terms

The expression "thermal engine", in its simplest, is any device which gets hot; i.e., the First and Second Laws of thermodynamics has applicability when describing a thermal engine's flow of energy and exergy in its production of useful output and has a heat rejection process. The term "condenser" is defined as any device used for the process of heat transfer to the local environment (commonly termed the system's "heat rejection"). In the context of this disclosure, thermal engine includes the "nuclear engine" and the "fossil engine". "Nuclear engine" is defined as any engine which is sustaining a nuclear fission or fusion reaction, and producing a useful output. "Fossil engine" is defined as an engine which is fueled with a hydrocarbon, combusting that fuel, and producing a useful output.

In detail, the expression "Turbine Cycle" (TC) is herein defined as both the physical and thermodynamic boundary of a Regenerative Rankine Cycle. The Cycle's working fluid defines its normally accepted thermodynamic boundary. A typical Turbine Cycle comprises all equipment bearing working fluid including, typically, a turbine-generator set producing electric power, a condenser, pumps, and Feedwater heaters.

The word "instigated" is herein defined as: to cause a deliberate action to occur, said action implemented using voice commands, a physical movement (e.g., turning a valve, pressing a control actuator), written instructions to subordinates, and/or using a programmed computer or using a computer system.

Throughout this disclosure, the expressions "First Law", "First Law conservation" and like expressions mean the same; that is, an application of the First Law of thermodynamic principles descriptive of the conservation of energy flows within a thermal engine. Throughout this disclosure, the expressions "Second Law", "Second Law exergy analy- In the context of defining this invention, the words: "examination of the set of associated output data for a set of identified thermal degradations associated with the thermal engine's components and processes (or thermal degradations influenced by its condenser, or thermal degradations influenced by its heat exchanger), and includes examination of measures to be taken to correct degradations" is describing the use of this invention's teachings of highly accurate treatments of irreversible and reversible heat exchanger affects. This involves using the First and Second Laws separately, and in combination. Used separately these Laws produce Thermal Performance Parameters described in '822 and '854 including FCIs and FFCIs; and corrects Carnot's $T_{Hot}$ associated with his famous Cycle and corrects irreversible losses for pressure drop affects ($\Delta g_{\Delta P-Corr}$), etc. Used in combination via the subtraction of a Second Law exergy analysis from a First Law conservation of energy flows produces a variety of thermodynamic parameters as taught associated with Eqs. (19) thru (31). Note, of course, that the First Law can be used for fossil-fired units independent of ICF; or when used for nuclear units, the ICV is mandated provided neutronics are involved. Further, in the context of describing this invention, the word "examination" means to compare computed thermodynamic parameters (e.g., Consumption Indices) and temporal trends in such parameters. An "examination" of an isolated parameter makes little sense without comparing it to its temporal record and trends in associated thermodynamic parameters. In summary, the words "thermodynamic parameters" encompass the following including their temporal trends: Exergetic Reversibilities, System Entropy Flow, Component Entropy Flow, component reversibilities [e.g., Eqs. (6) & (7)]; Consumption Indices [i.e., component irreversibilities via FCIs and FFCIs], the $\dot{S}_{Nucl}$ Ratio, the $\dot{S}_{Foss-SG}$ Ratio, Inertial Conversion Factor ($\Xi$) [e.g., as used in Eq. (26)-(30), Eq. (13), etc.];

nuclear power $[m_{RV}\Delta g_{RCX}]$; Core Thermal Power $[m_{RV}\Delta h_{RCX}$ and/or $m_{RV}\Delta g_{RCX}\Xi]$ and associated operational limits; the set of Thermal Performance Parameters as appropriate to heat exchangers, as defined in '856, Col. 53, Lines 18-62; and any similar such term as taught in this disclosure and in '822 and '856 as applicable.

In the context of defining this invention, the words: "an analytical model of a thermal engine's condenser whose traditional irreversible loss is replaced with a highly accurate irreversible loss based on an Exergetic Engine whose analytics comprise a correction to Carnot's $T_{Hot}$ based on a summation of the condenser's exergy flow, resulting in the highly accurate irreversible loss and is thus used to evaluate the thermal engine as influenced by its condenser" is herein interpreted, that when the analytical model produces a highly accurate $I_{Cond-Shell}$ value based on Eqs. (2), (11) & (13) and produces associated temporal trends, which all comprise a "set of associated output data", that the thermal engine's operator then has an ability to examine its unique and highly accurate output data for actionable information to correct thermal degradations found in the condenser and components within the system affected by the condenser's degradations. Note that temporal trends comprise: $I_{Cond-Shell}$; $R_{Cond-Shell}$ via Eq. (6); highly accurate Consumption Indices (given $FFCI_{Cond}$ or $FCI_{Cond}$ affect the summation of Consumption Indices); $I_{Cond-Shell}$ Versus condenser pressure; and other Thermal Performance Parameters. Such instigated actions improve thermodynamic understanding (and thus system operations) and safety.

In the context of defining this invention, the words: "an analytical model of a thermal engine's heat exchangers whose traditional Carnot reversibility is replaced with a highly accurate Exergetic Reversibility based on an Exergetic Engine whose analytics comprise a correction to Carnot's $T_{Hot}$ based on a summation of the heat exchanger's exergy flow, resulting in the highly accurate Exergetic Reversibility and is thus used to evaluate the thermal engine as influenced by its heat exchangers" is herein interpreted that when the analytical model produces a highly accurate Exergetic Reversibility, $f[(T_{Ref}/T_{Y-Corr})Q_{Y-Loss}]$ that the thermal engine's operator then has an ability to examine its unique and highly accurate output data, including temporal trends, for actionable information to correct thermal degradations. Exergetic Reversibility and associated temporal trends comprise: First Law less Second Law development of the first four terms on the right-side of Eq. (19), first three terms on the right-side of Eq. (22); Eq. (24B); and computed irreversibilities which led directly to Exergetic Reversibilities (as corrected) via Eqs. (4). These Exergetic Reversibilities and their trends lead directly to diagnostics based on Entropy Flows; specifically, Eqs. (26) thru (31). They also lead via Eq (4), to highly accurate Consumption Indices (given $FFCI_{Cond}$ or $FCI_{Cond}$ affect the summation to 1000 of all of Indices). And thus support temporal trends such as $I_{Cond-Shell}$ versus condenser pressure; $FCI_{Cond}$ versus condenser pressure; and other Thermal Performance Parameters.

In the context of defining this invention, the word "manipulates" (and its derivative "manipulation") is therein broadly defined as to organize data as is in the organization of temporal data whose presentation aids the thermal engine operator in his/her "examination of the set of associated output data"; this includes conversion of data (e.g., correction of gauge to absolute pressures, correction of pressure heads, unit conversions, visual presentations, and the like). Also, in context, the words "associated output data" refers to the root source which generated the "data"; e.g., "executed computer instructions, resulting in additions to the set of associated output data" implies that data derived or otherwise determined by executing computer instructions (including temporal data) is combined with (added to) "the set of output data".

As used herein, the root word "evaluate" and its derivative "evaluation" mean to analyze a set of highly accurate thermodynamic parameters for performance degradations with the thermal engine's components and processes. For example, the operator should evaluate at every monitoring cycle for increases in irreversibilities (i.e., higher Consumption Indices) thus forming a set of identified thermal degradations.

In the context of teaching this invention, the expression: "a set of analytical models of the thermal engine as a system of components and processes which produces a set of highly accurate thermodynamic parameters, and can thus be used to evaluate thermal degradations within the system, the set of highly accurate thermodynamic parameters based on a Second Law exergy analysis and one First Law conservation of energy flows" refers to the ability of a well taught methodology to assist in identifying components whose performances are thermally degraded. Of course, if the thermal engine is a power plant it will consist of hundreds of components, chasing all at once is a rabbit hole. Taught in this disclosure is to concentrate only on the very few Exergetic Reversibilities present in any thermal engine, the condenser having paramount importance. The "how" degradations are identified is accomplished, for example, by first monitoring trends in Consumption Indices associated with components with Exergetic Reversibility. For example, an increase in the condenser's (or any heat exchanger's) Consumption Index should draw immediate attention to any changes in $R_{Cond-Shell}$, plots of $R_{Cond-Shell}$ Versus condenser pressure, etc., this is key given the demonstrated sensitivity condenser Exergetic Reversibility has on thermodynamically understanding a thermal engine, its operations and safety. Using changes in $R_{Cond-Shell}$, given its importance, the operator must then review all Consumption Indices for increases in irreversible losses, and thus identify various degradations within the thermal engine's components and processes.

In the context of teaching this invention, the expression: "action instigated by the thermal engine's operator based on the set of both identified thermal degradations and their corrective measures, thereby improving the thermal engine's thermodynamic understanding and safety" refers to the thermal engine's operator instigating "corrective" action. For any thermal engine having the complexity of a modern power plant the operator typically has a ≈dozen corrective measures to consider for any given identified component degradation. This is especially true for the fossil engine. Such actions must rely on the operator's experience and knowledge of system components coupled to analytics resulting in computed, unique and highly accurate, irreversible losses and/or Exergetic Reversibilities and/or Entropy Flows. For example, if the temporal record of $I_{Cond-Shell}$ or $R_{Cond-Shell}$ indicates change then the operator will instigate any one of the following actions given knowledge of their particular condenser: if available, to engage additional circulatory water pumps to reduce condenser pressure; based on a temporal trend of ambient wet-bulb temperature versus condenser pressure, the operator could engage air ejectors (to remove non-condensable gases); the operator could engage the condenser's vacuum pumps to lower pressure; correction of a high condenser hot well level is addressed by opening emergency drain valves; during an outage, the operator could direct chemically cleaning of the condenser's shell-side and/or clean the inside of condenser tubes; the operator could take action to isolate the lowest pressure Feedwater heater to gain a portion of the lost power resultant from a degraded condenser performance (given that its $\dot{m}\Delta g_{Tube}$ increase is significantly lower than the average in the feedwater train); etc. For the fossil engine the operator taking corrective action has direct consequences of preventing degradation and failure of equipment; this is an obvious safety issue as it protects the public from loss of the engine's useful output. For the nuclear engine, taking corrective action has immediate, and obvious, public consequences. Such an engine is simpler than its fossil counterpart given the only moving parts interfacing with the nuclear core are control rods, coolant pumps and pumps which add or remove neutron absorbers. Control of a nuclear engine is described in '822, Column 6, Line 9 thru Column 9, Line 6; as taught, the principal corrective measure(s) are termed "Mechanisms for Controlling the Rate of Fission" (MCRF) as a singular mechanism or a plurality of mechanisms, instigated by the plant operator, which result in altering the rate of nuclear fission. Indeed, as taught in '822 and '856 if its "SEP Power Trip Limit" parameter is exceeded, thus jeopardizing the safety of the public, the operator's corrective action must result in a TRIP of the unit; see '822, Col. 16, Lines 21-41 and similar teachings in '85.

As used herein, the root words "obtain", "determine" and "establish", and their related derivatives (e.g., "obtained", "determined", "established", "obtaining", "determining" and "establishing") are all defined as taking a certain action. The certain action encompasses: to directly measure, to calculate by hand, to calculate using a programmed computer, to authorize calculations using a programmed computer at a facility controlled by the authorizer, to make an assumption, to make an estimate, and/or to gather a database. For example, "a determination the nuclear engine's Core Thermal Power" means to obtain this parameter by using a combination of: a set of thermodynamic extensive properties; the NCV Method; a First Law conservation of Turbine Cycle energy flows; and/or an indicated Reactor Vessel coolant mass flow. In the context of teaching this invention, the expression: "an analytical model of the nuclear engine which comprises a determination of Core Thermal Power, a set of Inertial Conversion Factors (ICF) and the set of thermodynamic extensive properties of the nuclear engine's coolant, which produce both a set of operational limits applicable for the nuclear engine's Core Thermal Power such that the set of Regulatory Limits are not exceeded" is addressing the teachings associated with Eqs. (30A) thru (30C). As an example, "operational limits" are defined as a maximum term $[m_{RV\text{-}NCV}(t) \, \Delta g_{RCX}(t) \Xi_{U\text{-}Pu}(t)]$ found on the left side of Eq. (30B), and a minimum term $[m_{RV\text{-}NCV}(0) \, \Delta g_{RCX}(0) \Xi_{U235}]$ found on the right. Thus, operational limits numerically bracket Core Thermal Power $[m_{RV\text{-}NCV}(t) \Delta h_{RCX}(t)]$. "Range testing", in the context of Eq. (30) refers, simply, to a test in which Core Thermal Power (CTP) or $[\Delta h_{RCX}(t)]$ cannot exceed the operational limits. If range testing fails then: 1) parameters comprising CTP are in error (and especially if the maximum term is exceeded); 2) ICF data is in error (e.g., burnup is not understood); or 3) operational limits are reasonably accurate and therefore the nuclear engine is in violation of Regulatory Limits. In summary, a range testing failure means the operator must take action . . . the nuclear engine is not understood to the degree possible given the teachings herein.

As used herein, the words "monitoring" or "monitored" are meant to encompass both on-line monitoring (i.e., processing system data in essentially real time) and off-line monitoring (i.e., computations involving static data). A "Calculational Iteration" or "monitoring cycle" is meant to be one execution of the processes, for example, described in '856 FIG. 5 which comprises: acquiring data, exercising a mathematical model including, if required, matrix solution, minimization analysis, etc.

As used herein, the word "indicated" is herein defined as the system's actual and uncorrected signals from a physical process (e.g., pressure, temperature or quality, mass flow, volumetric flow, density, and the like) whose accuracy or inaccuracy is not assumed. As examples, a system's "indicated Reactor Vessel coolant mass flow", or its "indicated Turbine Cycle feedwater mass flow", or the condenser's "indicated saturation temperature", and like usage denotes system measurements, the accuracy of which is unknown (they are "as-is", with no judgement applied). Such indicated measurements are said to be either correctable or not. It may be that the corresponding computed value tracks the indicated value over time. For example, for the case of an indicated RV coolant mass flow, it may be shown that the NCV computed mass flow tracks the indicated flow.

As used herein, the words "programmed computer" or "operating the programmed computer" or "using a computer" are herein defined as the action encompassing either to directly operate a programmed computer, to cause the operation of a programmed computer, or to authorize the operation of a programmed computer at a facility controlled by the authorizer.

The word "understanding", in context of understanding a thermal engine, is herein defined as the operator having gained unique comprehension of his/her thermal engine based on a set of highly accurate thermodynamic parameters comprising: irreversible losses, System Reversibilities, Component Reversibilities, Exergetic Reversibilities and/or Entropy Flows; all taught herein thus allowing actionable information to be established which identifies thermal degradations. Said thermal degradations are witnessed via temporal trends in computed in the set of highly accurate thermodynamic parameters which results in Consumption Indices and Thermal Performance Parameters. Said actionable information results in improved system operations and improved safety. In this context, a ±2% uncertainty in a nuclear engine-believed acceptable by the U.S. Nuclear Regulatory Commission-means a 4% range in First Law energy flows across the core which is considered institutionally unsafe. '822 demonstrates a ±0.20% uncertainty which is further improved to a potential ±0.13% uncertainty using the set of highly accurate thermodynamic parameters.

The words "temporal trend" or "temporal trending" mean having time dependency. These words imply the use of historical records, that is records involving computed parameters based on this disclosure, records used to judge whether a given component or process is degrading or improving as observed by examining temporal trends. Said historical records being stored by the computer's memory means.

Although the present invention has been described in considerable detail with regard to certain Preferred Embodiments thereof, other embodiments within the scope and spirit of the present invention are possible without departing from the general industrial applicability of the invention.

DETAILED DESCRIPTION OF THE DRAWINGS

FIG. 1A is a visual representation of Exergetic Engines used to describe the thermodynamics of a shell and tube heat exchanger. Nomenclature includes: TI & TU refer to tube inlet & outlet states and flow; SI, SU and DI are shell-side inlets, outlet and return inlet drains states and flows. FIG. 1A defines: $T_{CDS-Corr} \equiv T_{CDS} + \Delta T_{Corr}$; where $T_{CDS}$ is the absolute saturation temperature as $f(P_{Cond})$. Note that the symbol SI represents multiple input streams to the condenser's shell; typically, they comprise LP turbine exhaust, turbine seal flows, auxiliary turbine exhaust, valve stem leakages, and the like. This disclosure weights all shell-side inlet and outlet streams (SI, DI and SU) when developing the $\Sigma_{Shell}$ $(mg)_k$ term for Eq. (11); i.e., descriptive of "k" input and output streams, resulting in a $\Delta T_{Corr}$. Item 905 is a representation of the physical condenser. It is divided, for analytical purposes, into its shell 910 and its tube bank 915. The heat rejection, $Q_{REJ}$ is considered positive from the shell and negative from the tube blank. It is processed through the theoretical Exergetic Engines 920 and 925 which convert the $\pm Q_{REJ}$ to reversibilities and irreversibilities per Eqs. (4) & (5). Items 930 & 940 are fictional components, receptors of reversibilities. Items 935 & 945 are fictional components, receptors of irreversibilities. Items 930 thru 945 as thermodynamic receptors have no physical meaning.

FIG. 1B is a visual representation of an Exergetic Engine used to describe the thermodynamics of the shell-side of a heat exchanger which loses an energy flow to its local environment. Nomenclature, for example, assumes a nuclear power plant's Reactor Vessel heat loss associated with its outer flow annulus: RVI is the coolant's inlet state and flow, and RCI is the outlet from the outer annulus and entrance to the nuclear core. FIG. 1B defines: $T_{RVI-Corr} \equiv T_{RVI} + \Delta T_{Corr}$; where $T_{RVI}$ is the absolute RV inlet temperature. Item 955 is a representation of the shell-side of the physical heat exchanger. If describing a RV, then heat loss to the environment is generated from convection and thermal radiation losses (a positive $Q_{Conv}$), and from heating structural materials and the coolant given dissipation of nuclear radiation from beta (β), gamma (γ) and neutron scattering. β and associated Bremsstrahlung radiation is spent between the peripheral fuel assemblies and the inner shell of the outer flow annulus. γ and $^1n_0$ heating of RV structures occurs between the peripheral fuel assemblies and the outer RV vessel. Such heating effecting the net RV loss is determined as the difference between the incident thermal dissipation present at the core's boundary, $Q_{RadI}$, less that loss to the environment, $Q_{RadU}$. Note, as defined in '822, nuclear radiation responsible for $Q_{RadU}$, if significant, can only be described as a pure irreversible loss from the system (use of an Exergetic Engine has no meaning). However, the gain in fluid energy flow from nuclear radiation and losses via convection result in a net a RV shell energy flow ($Q_{RV-Loss}$), positive or negative; a $[Q_{Conv} - (Q_{RadI} - Q_{RadU})]$. If $Q_{RV-Loss} > 0.0$ it is processed through a theoretical Exergetic Engine 970 which converts the energy flow to reversibilities and irreversibilities per Eq. (4). If negative, $I_{RV-Loss} = 0.0$, then the effects of $|Q_{RV-Loss}|$ must be added to Core Thermal Power. Items 980 & 985 are fictional components, receptors of reversibilities and irreversibilities without physical meaning.

FIG. 2 is a representation of thermodynamic laws appropriate for both a nuclear or fossil engine. Items 710 and 810 represent a generic power system. System 710 is analyzed using Second Law exergy analysis. This same system 810 is also analyzed using First Law conservation of energy flows. The 710 and 810 system is either a complete Nuclear Steam Supply System (NSSS), a fossil-fired power plant, or an isolated Turbine Cycle. Items 720 and 820 are the same, descriptive of shaft powers entering the system; for example, these are the pump shaft powers associated with a NSSS, or for a fossil-fired system would include boiler recirculation pump power, TC pumps and combustion air fan shaft powers. Evaluation of shaft powers 720 & 820, require extensive properties at the inlets & outlets and mass flows associated with the pumps, fans, etc. Note that Eqs. (2ND) and (1ST) assume, by example, that Feedwater pumps are driven by an Auxiliary Turbine; thus a $\Sigma P_{FWP-k2}$ shaft power term does not cross the system boundary. Items 725 and 825 are the same, descriptive of the same useful power output, $P_{GEN}$. For the power plant, $P_{GEN}$ is an energy flow delivered to a turbine-generator shaft resulting in electric power; or $P_{GEN}$ could describe an energy flow used for space heating. Resolution of $P_{GEN}$ is made by matrix solution as taught in '822, or by direct measurement of the electric generation, accounting for generator losses; or a measured useful mΔh steam flow. If 710 is an isolated Turbine Cycle, its $G_{IN}$ is mΔg supplied at the boundary; for 810 an energy flow, ṁΔh, supplied; system output being $P_{GEN}$. Input quantities required to evaluate nuclear power 715, are supplied by the Neutronics Model and identified instrumentation needed to produce intensive properties discussed in '822. The Preferred Embodiment of analyzing a fossil-fired involves use of the computer simulator EX-FOSS. When monitoring in real time, On-Line Operating Parameters are required comprising extensive properties. The driving force behind nuclear fission produced power is neutron flux, $\Phi_{TH}$, which is a declared unknown for the Preferred Embodiment and Alternative Embodiments A thru E discussed in '822. The driving force behind fossil-fired produced power is fuel mass flow, which is a computed output from the EX-FOSS program. $\Sigma I_k$ Item 730 is described generically by Eq. (53) in '822, applicable for nuclear or fossil. Individual $I_k$ terms are taught through Eqs. (1) thru (18), and of course, require component indicated Δg and Δs extensive properties and mass flows. Critical for thermodynamically understanding a power plant is to establish *nexus* between Items 715 & 815 via their respective losses. If Item 710 is a nuclear power plant, its supplied nuclear potential (its Free Exergy) 715 is a $f[\Phi_{TH} \Sigma_F(\bar{\upsilon}_{REC} + \bar{\upsilon}_{TNU})]$ this same system 810 is supplied a thermal power 815 formed by converting the recoverable portion of 715, $f[\Phi_{TH} \Sigma_F \bar{\upsilon}_{REC}]$ using an Inertial Conversion Factor described by Eqs. (9) & (10) in '822. If Item 710 is a fossil-fired power plant, its supplied fossil potential 715 comprises principally the fuel and combustion air exergy flows. Its thermal power is the fuel's As-Fired mass flow times a corrected heating value, $m_{AF}(HHVP+HBC)$, see US Patents '429 and '526.

FIG. 2 suggests a simultaneous evaluation of the potential and thermal powers' differing losses. Second Law description of a power system 710, states that the $G_{IN}$ input consists of the total potential power supplied 715 plus any shaft power additions 720. $G_{IN}$ is the total exergy flow supplied to the system (a potential); it is, of course, the system's maximum "available power". $G_{IN}$ is destroyed as the system creates $P_{GEN}$ 725 and irreversible losses $\Sigma I_k$ 730. First Law description of this same power system 810 states that the total energy flow input supplied consists of thermal power plus shaft powers supplied; herein defined as $\Sigma \dot{m} \Delta h_{IN}$ (Items 815 plus 820). $\Sigma \dot{m} \Delta h_{IN}$ is converted to $P_{GEN}$ 825 and energy flows losses heating the environment given the condenser's heat rejection 830 ($Q_{REJ}$) plus miscellaneous vessel losses 835 ($Q_{Y-Loss}$); said losses are herein defined and summed as $\Sigma Q_{Loss}$). The difference between Second and First Law treatments of exergy and energy flows supplied, and their associated losses, implies that Second Law $G_{IN}$ supplied less $\Sigma I_k$, must equal First Law $\Sigma \dot{m} \Delta h_{IN}$ supplied less $\Sigma Q_{Loss}$. Teaching such differences result in Eqs. (19) and (22), with associated discussions.

What is claimed is:

1. A computing apparatus whose output data is used to evaluate a thermal engine as a system of components and processes thereby improving the thermal engine's thermodynamic understanding and safety, the computing apparatus comprising:

a data acquisition device to collect data associated with the thermal engine comprising Operating Parameters which include a set of Off-Line Operating Parameters and a set of On-Line Operating Parameters, resulting in a set of acquired system input data;

a computer with a processing and memory means which includes an ability for processing a set of computer instructions, processing the set of acquired system input data, processing a set of associated output data and memory means for storing temporal trends of data as part of the set of associated output data;

a set of analytical models of the thermal engine as a system of components and processes which produces a set of highly accurate thermodynamic parameters, and can thus be used to evaluate thermal degradations within the system, the set of highly accurate thermodynamic parameters based on a Second Law exergy analysis and one First Law conservation of energy flows selected from the group comprising a First Law conservation of energy flows which uses an Inertial Conversion Factor (ICF) and a First Law conservation of energy flows which does not use the ICF;

the set of computer instructions, when executed by the computer, includes description of the set of analytical models and the set of highly accurate thermodynamic parameters, and, further, includes manipulation of the set of acquired system input data and the set of associated output data, resulting in a programmed computer;

execution of the programmed computer based on the set of computer instructions, resulting in additions to the set of associated output data;

examination of the set of associated output data for a set of identified thermal degradations associated with the thermal engine's components and processes, and includes examination of measures to be taken to correct degradations, resulting in a set of both identified thermal degradations and their corrective measures; and action instigated by the thermal engine's operator based on the set of both identified thermal degradations and their corrective measures, thereby improving the thermal engine's thermodynamic understanding and safety.

2. The computing apparatus of claim 1, wherein the set of analytical models of the thermal engine includes use of the ICF as associated with a nuclear engine fueled with $^{235}$U, producing $\Xi_{U235}$ and an associated $\dot{S}_{Nucl}$ Ratio; and wherein the set of computer instructions includes manipulation of the difference between $[\Sigma_{U235}-1.0]$ and the associated computed $\dot{S}_{Nucl}$ Ratio.

3. The computing apparatus of claim 1, wherein the set of analytical models of the thermal engine includes use of the ICF as associated with a nuclear engine fueled with $^{233}$U, producing $\Sigma_{U233}$ and an associated $\dot{S}_{Nucl}$ Ratio; and wherein the set of computer instructions includes manipulation of the difference between $[\Xi_{U233}-1.0]$ and the associated computed $\dot{S}_{Nucl}$ Ratio.

4. The computing apparatus of claim 1, wherein the set of analytical models of the thermal engine includes use of the ICF as associated with a nuclear engine breeding $^{238}$U, producing an average $\Xi_{Breeder}(t)$ reflecting $^{235}$U, $^{239}$Pu and $^{241}$Pu concentrations as a function of burnup, and an associated computed $\dot{S}_{Nucl}$ Ratio; and wherein the set of computer instructions includes manipulation of the difference between $[\Xi_{Breeder}(t)-1.0]$ and the associated computed $\dot{S}_{Nucl}$ Ratio.

5. The computing apparatus of claim 1, wherein the set of analytical models of the thermal engine includes use of a Fixed $T_{Ref}$.

6. The computing apparatus of claim 1, wherein the set of analytical models of the thermal engine includes use of a Floated $T_{Ref}$.

7. The computing apparatus of claim 1, wherein the set of analytical models of the thermal engine as the system of components and processes includes a collection of heat exchangers which form a steam generator whose tube-side analytics includes correcting the steam generator's indicated drum saturation temperature based on the summation of tube-side exergy flows.

8. The computing apparatus of claim 1, wherein the set of analytical models of the thermal engine as the system of components and processes includes a collection of heat exchangers which form a steam generator whose thermodynamic boundary consists of the shell-side heat of exchangers.

9. The computing apparatus of claim 1, wherein the set of analytical models of the thermal engine as the system of components and processes includes a collection of heat exchangers which form a steam generator whose thermodynamic boundary consists of the tube-side of heat exchangers.

10. The computing apparatus of claim 1, wherein the set of analytical models of the thermal engine as the system of components and processes includes a selection of heat exchangers components which have a heat loss to the local environment whose analytical models comprise a highly accurate Exergetic Reversibilities, and thus can be used to evaluate thermal degradations within the thermal engine.

11. The computing apparatus of claim 1, wherein the set of analytical models of the thermal engine as the system of components and processes includes a process of power production whose analytical models comprise a highly accurate Consumption Index of the process of power production.

12. A computing apparatus whose output data is used to evaluate a thermal engine as influenced by its condenser, thereby improving the thermal engine's thermodynamic understanding and safety, the computing apparatus comprising:

a data acquisition device to collect data associated with the thermal engine comprising Operating Parameters which include a set of Off-Line Operating Parameters and a set of On-Line Operating Parameters, resulting in a set of acquired system input data;

a computer with a processing and memory means which includes an ability for processing a set of computer instructions, processing the set of acquired system input data, processing a set of associated output data and memory means for storing temporal trends of data as part of the set of associated output data;

an analytical model of a thermal engine's condenser whose traditional irreversible loss is replaced with a highly accurate irreversible loss based on an Exergetic Engine whose analytics comprise a correction to Carnot's $T_{Hot}$ based on a summation of the condenser's exergy flow, resulting in a set of highly accurate thermodynamic parameters including the highly accurate irreversible loss and is thus used to evaluate the thermal engine as influenced by its condenser;

the set of computer instructions, when executed by the computer, includes description of the analytical model and the set of highly accurate thermodynamic parameters, and, further, includes manipulation of the set of acquired system input data and the set of associated output data, resulting in a programmed computer;

execution of the programmed computer based on the set of computer instructions, resulting in additions to the set of associated output data;

examination of the set of associated output data for a set of identified thermal degradations associated with the thermal engine as influenced by its condenser, and includes examination of measures to be taken to correct the degradations, resulting in a set of both identified thermal degradations and their corrective measures; and action instigated by the thermal engine's operator based on the set of both identified thermal degradations and their corrective measures, thereby improving the thermal engine's thermodynamic understanding and safety.

13. The computing apparatus of claim 12, wherein the analytical model of the thermal engine's condenser comprises correcting the condenser's shell-side indicated saturation temperature based on the summation of the condenser's shell-side exergy flows, said summation based on a Fixed $T_{Ref}$.

14. The computing apparatus of claim 12, wherein the analytical model of the thermal engine's condenser comprises correcting the condenser's shell-side indicated saturation temperature based on the summation of the condenser's shell-side exergy flows, said summation based on a Floated $T_{Ref}$.

15. The computing apparatus of claim 12, wherein the analytical model of the thermal engine's condenser comprises an analytical model of a single-side of the condenser whose heat transfer is lost to the local environment.

16. The computing apparatus of claim 12, wherein the analytical model of the thermal engine's condenser also includes correcting the condenser's $T_{Hot}$ for pressure drop effects using a $\Delta g_{\Delta P\text{-}Corr}$ quantity.

17. The computing apparatus of claim 12, wherein the analytical model of the thermal engine's condenser whose traditional irreversible loss is replaced with the highly accurate irreversible loss, and includes a highly accurate Consumption Index of the thermal engine's condenser based on the highly accurate irreversible loss.

18. A computing apparatus whose output data is used to evaluate a thermal engine as influenced by its heat exchangers, thereby improving the thermal engine's thermodynamic understanding and safety, the computing apparatus comprising:

a data acquisition device to collect data associated with the thermal engine comprising Operating Parameters which include a set of Off-Line Operating Parameters and a set of On-Line Operating Parameters, resulting in a set of acquired system input data;

a computer with a processing and memory means which includes an ability for processing a set of computer instructions, processing the set of acquired system input data, processing a set of associated output data and memory means for storing temporal trends of data as part of the set of associated output data;

an analytical model of a thermal engine's heat exchangers whose traditional Carnot reversibility is replaced with a highly accurate Exergetic Reversibility based on an Exergetic Engine whose analytics comprise a correction to Carnot's $T_{Hot}$ based on a summation of the heat exchanger's exergy flow, resulting in a set of highly accurate thermodynamic parameters including the highly accurate Exergetic Reversibility and is thus used to evaluate the thermal engine as influenced by its heat exchangers;

the set of computer instructions, when executed by the computer, includes description of the analytical model and the set of highly accurate thermodynamic parameters, and, further, includes manipulation of the set of acquired system input data and the set of associated output data, resulting in a programmed computer;

execution of the programmed computer based on the set of computer instructions, resulting in additions to the set of associated output data;

examination of the set of associated output data for a set of identified thermal degradations associated with the thermal engine as influenced by its heat exchangers, and includes examination of measures to be taken to correct the degradations, resulting in a set of both identified thermal degradations and their corrective measures; and action instigated by the thermal engine's operator based on the set of both identified thermal degradations and their corrective measures, thereby improving the thermal engine's thermodynamic understanding and safety.

19. The computing apparatus of claim 18, wherein the analytical model of the thermal engine's heat exchangers whose traditional Carnot reversibility is replaced with the highly accurate Exergetic Reversibility based on the Exergetic Engine whose analytics comprise the correction to Carnot's $T_{Hot}$ based on a summation of the heat exchanger's exergy flow, said summation based on a Fixed $T_{Ref}$.

20. The computing apparatus of claim 18, wherein the analytical model of the thermal engine's heat exchangers whose traditional Carnot reversibility is replaced with the highly accurate Exergetic Reversibility based on the Exergetic Engine whose analytics comprise the correction to Carnot's $T_{Hot}$ based on a summation of the heat exchanger's exergy flow, said summation based on a Floated $T_{Ref}$.

21. The computing apparatus of claim 18, wherein the analytical model of the thermal engine's heat exchangers whose traditional Carnot reversibility is replaced with the highly accurate Exergetic Reversibility based on the Exergetic Engine whose analytics comprise a correction for pressure drop effects using a $\Delta g_{\Delta P\text{-}Corr}$ quantity.

22. The computing apparatus of claim 18, wherein the analytical model of the thermal engine's heat exchangers whose traditional Carnot reversibility is replaced with the highly accurate Exergetic Reversibility based on the Exergetic Engine whose analytics comprise the correction to Carnot's $T_{Hot}$ based on a summation of the heat exchanger's shell-side exergy flow.

23. The computing apparatus of claim 18, wherein the analytical model of the thermal engine's heat exchangers whose traditional Carnot reversibility is replaced with the highly accurate Exergetic Reversibility based on the Exergetic Engine whose analytics comprise the correction to Carnot's $T_{Hot}$ based on a summation of the heat exchanger's tube-side exergy flow.

24. A computing apparatus whose output data is used to prevent a nuclear engine's thermal power from exceeding regulatory limits, thereby improving the nuclear engine's thermodynamic understanding and safety, the computing apparatus comprising:

a data acquisition device to collect data associated with the nuclear engine comprising Operating Parameters which include a set of Off-Line Operating Parameters and a set of On-Line Operating Parameters, which include a set of thermodynamic extensive properties of the nuclear engine's Reactor Vessel coolant, a set of applicable Regulatory Limits on the nuclear engine's Core Thermal Power and identification of Mechanisms for Controlling the Rate of Fission (MCRF), resulting in a set of acquired system input data;

a computer with a processing and memory means which includes an ability for processing a set of computer instructions, processing the set of acquired system input data, processing a set of associated output data and memory means for storing temporal trends of data as part of the set of associated output data;

an analytical model of the nuclear engine which comprises a determination of Core Thermal Power, a set of Inertial Conversion Factors (ICF), and the set of thermodynamic extensive properties, which produce a set of operational limits applicable for the nuclear engine's Core Thermal Power such that the set of Regulatory Limits are not exceeded, resulting in the analytical model which includes range testing of Core Thermal Power;

the set of computer instructions, when executed by the computer, includes description of the analytical model, and, further, includes manipulation of the set of acquired system input data and the set of associated output data, resulting in a programmed computer;

execution of the programmed computer based on the set of computer instructions including range testing of Core Thermal Power, ensuing a set of results from range testing of Core Thermal Power being added to the set of associated output data;

examination of the set of associated output data; and action instigated by the nuclear engine's operator by adjusting MCRF such that the Core Thermal Power does not exceed the set of Regulatory Limits based on the set of results from range testing of Core Thermal Power, thereby improving thermodynamic understanding and safety.

25. The computing apparatus of claim 24, wherein the analytical model of the nuclear engine includes the determination of Core Thermal Power based on the Neutronics/calorimetrics/Verification (NCV) Method, and the set of thermodynamic properties.

26. The computing apparatus of claim 24, wherein the analytical model of the nuclear engine includes the determination of Core Thermal Power based on a method approved by the U.S. Nuclear Regulatory Commission.

27. The computing apparatus of claim 24, wherein the analytical model of the nuclear engine includes the determination of Core Thermal Power based on an indicated Reactor Vessel coolant mass flow and the set of thermodynamic properties.

28. The computing apparatus of claim 24, wherein the analytical model of the nuclear engine is based on a Fixed $T_{Ref}$.

29. The computing apparatus of claim 24, wherein the analytical model of the nuclear engine includes range testing of the set of thermodynamic extensive properties of the nuclear engine's Reactor Vessel coolant, resulting in corrections made to the Core Thermal Power.

30. The computing apparatus of claim 24, wherein the analytical model of the nuclear engine includes the set of thermodynamic extensive properties of the nuclear engine's Reactor Vessel coolant based on Reactor Vessel pressure drops, resulting in corrections made to the nuclear engine's ΔExergy increase in Reactor Vessel's coolant.

31. The computing apparatus of claim 24, wherein the analytical model of the nuclear engine includes Neutronics/calorimetrics/Verification (NCV) Method's Verification Procedures operating on the reactor core's set of thermodynamic extensive properties and a temporal Inertial Conversion Factor, resulting in corrections made to the Core Thermal Power.

32. The computing apparatus of claim 24, wherein the analytical model of the nuclear engine includes verification of the Reactor Vessels' coolant mass flow and a temporal Inertial Conversion Factor, resulting in corrections made to the Core Thermal Power.

* * * * *